United States Patent
Wang et al.

(10) Patent No.: US 10,990,222 B2
(45) Date of Patent: Apr. 27, 2021

(54) CALIBRATION OF TRACKPAD

(71) Applicant: Google LLC, Mountain View, CA (US)

(72) Inventors: Jianxun Wang, Sunnyvale, CA (US);
Igor Markovsky, Sunnvale, CA (US);
Debanjan Mukherjee, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/397,816

(22) Filed: Apr. 29, 2019

(65) Prior Publication Data
US 2020/0341584 A1    Oct. 29, 2020

(51) Int. Cl.
| | | |
|---|---|---|
| *G06F 3/041* | (2006.01) | |
| *G06F 3/044* | (2006.01) | |
| *G01L 25/00* | (2006.01) | |
| *G06F 3/045* | (2006.01) | |

(52) U.S. Cl.
CPC ........ *G06F 3/0418* (2013.01); *G06F 3/04144* (2019.05); *G01L 25/00* (2013.01); *G06F 3/045* (2013.01); *G06F 3/0448* (2019.05); *G06F 2203/04105* (2013.01)

(58) Field of Classification Search
CPC .. G06F 3/0418; G06F 3/04144; G06F 3/0448; G06F 3/045; G06F 2203/04105; G06F 3/03547; G01L 25/00
See application file for complete search history.

(56) References Cited

U.S. PATENT DOCUMENTS

| | | | |
|---|---|---|---|
| 4,745,565 A | * | 5/1988 | Garwin .............. G06F 3/04142 |
| | | | 702/95 |
| 8,527,228 B2 | | 9/2013 | Panagas |
| 9,201,461 B2 | | 12/2015 | Hotelling et al. |
| 9,459,173 B2 | | 10/2016 | White et al. |
| 10,139,959 B2 | | 11/2018 | Butler et al. |
| 2011/0291939 A1 | | 12/2011 | Tsukahara et al. |
| 2014/0210784 A1 | | 7/2014 | Gourevitch et al. |
| 2014/0293163 A1 | | 10/2014 | Ju et al. |
| 2014/0320199 A1 | | 10/2014 | Trend et al. |
| 2014/0333555 A1 | | 11/2014 | Oh et al. |
| 2014/0362036 A1 | | 12/2014 | Mo et al. |

(Continued)

OTHER PUBLICATIONS

EE263, https://see.stanford.edu/materials/lsoeldsee263/06-ls-app.pdf (Year: 2008).*

(Continued)

*Primary Examiner* — Patrick N Edouard
*Assistant Examiner* — Douglas M Wilson
(74) *Attorney, Agent, or Firm* — Brake Hughes Bellermann LLP

(57) ABSTRACT

A method includes: placing a first physical object at each of a first plurality of locations on a trackpad; while the first object is at each of the first plurality of locations, registering respective first readings from each of a second plurality of force sensors of the trackpad, the first plurality greater than the second plurality; selecting a first plurality of sensitivity parameters for the trackpad based at least in part on the first readings; and providing the first plurality of sensitivity parameters to force sensing circuitry of the trackpad, the force sensing circuitry coupled to the second plurality of force sensors.

20 Claims, 12 Drawing Sheets

(56) References Cited

U.S. PATENT DOCUMENTS

| | | |
|---|---|---|
| 2015/0268765 A1 | 9/2015 | Nakayama et al. |
| 2015/0317002 A1* | 11/2015 | King-Smith ........ G06F 3/04166 345/177 |
| 2015/0355752 A1* | 12/2015 | Kurasawa ............. G06F 3/0446 345/174 |
| 2016/0132153 A1* | 5/2016 | Lin ....................... G06F 3/0446 345/174 |
| 2016/0209984 A1* | 7/2016 | Richards ............... G06F 3/0445 |
| 2016/0216796 A1 | 7/2016 | Johansson et al. |
| 2016/0259411 A1 | 9/2016 | Yoneoka et al. |
| 2016/0274727 A1* | 9/2016 | Nakamura ............ G06F 3/0448 |
| 2016/0357297 A1 | 12/2016 | Picciotto et al. |
| 2016/0357327 A1 | 12/2016 | Chang et al. |
| 2017/0153760 A1* | 6/2017 | Chawda ................ G06F 1/1694 |
| 2017/0228079 A1* | 8/2017 | Kurasawa ........... G06F 3/04166 |
| 2017/0322671 A1* | 11/2017 | Park .................... G06F 3/04142 |
| 2018/0018859 A1 | 1/2018 | Harris |
| 2019/0064984 A1 | 2/2019 | Schwartz et al. |

OTHER PUBLICATIONS

International Search Report and Written Opinion for PCT Application No. PCT/US2019/062430, dated Feb. 26, 2020, 14 pages.

\* cited by examiner

CALIBRATION OF TRACKPAD

TECHNICAL FIELD

This document relates, generally, to calibration of a trackpad.

BACKGROUND

Some devices use a trackpad or touchpad to register input from a user to the system. Input can be registered as position information to guide the user in pointing to objects or locations on an accompanying screen. Input can be registered as a force or displacement, to allow the user to click on a displayed object. Some existing trackpads are designed with a hinged surface that pivots along one of its edges, to allow the user to input taps or clicks.

SUMMARY

In a first aspect, a method includes: placing a first physical object at each of a first plurality of locations on a trackpad; while the first object is at each of the first plurality of locations, registering respective first readings from each of a second plurality of force sensors of the trackpad, the first plurality greater than the second plurality; selecting a first plurality of sensitivity parameters for the trackpad based at least in part on the first readings; and providing the first plurality of sensitivity parameters to force sensing circuitry of the trackpad, the force sensing circuitry coupled to the second plurality of force sensors.

Implementations can include any or all of the following features. Selecting the first plurality of sensitivity parameters comprises performing a linear least squares. The linear least squares involves known force values and the first readings. The first readings form an n×m array, the number n equal to the first plurality, the number m equal to the second plurality, wherein the first plurality of sensitivity parameters form an m×1 array, wherein the known force values form an n×1 array, wherein a vector expression includes the n×1 array subtracted by a product of the n×m array and the m×1 array, and wherein performing the linear least squares includes minimizing a norm of the vector expression. The method further includes: determining a first plurality of first sensitivity parameters corresponding to the first readings, wherein the first plurality of sensitivity parameters is selected based at least in part on the first plurality of first sensitivity parameters. The method further includes: selecting a second physical object having different mass than the first physical object; placing the second physical object at each of the first plurality of locations on the trackpad; while the second object is at each of the first plurality of locations, registering respective second readings from each of the second plurality of force sensors of the trackpad; and determining a first plurality of second sensitivity parameters corresponding to the second readings. The first plurality of sensitivity parameters are selected based also at least in part on the first plurality of second sensitivity parameters. Selecting the first plurality of sensitivity parameters comprises performing a polynomial fitting using the first plurality of first sensitivity parameters and the first plurality of second sensitivity parameters. The first plurality of sensitivity parameters includes the first plurality of first sensitivity parameters and the first plurality of second sensitivity parameters, the method further comprising: registering a third reading of the second plurality of force sensors based on a third physical object touching the trackpad; selecting primary sensitivity parameters from among the first plurality of first sensitivity parameters and the first plurality of second sensitivity parameters; determining, using the force sensing circuitry, a primary estimated force of the third physical object based on the third reading and the primary sensitivity parameters; selecting secondary sensitivity parameters from among the first plurality of first sensitivity parameters and the first plurality of second sensitivity parameters based on the primary estimated force; determining, using the force sensing circuitry, a secondary estimated force of the third physical object based on the third reading and the secondary sensitivity parameters; and performing an action, in response to the third physical object touching the trackpad, based on the secondary estimated force. The method further includes: placing the first physical object at another location on the trackpad not included in the first plurality of locations; registering a third reading of the second plurality of force sensors based on the first physical object placed at the other location; determining, using the force sensing circuitry, an estimated force of the first physical object based on the third reading and the first plurality of sensitivity parameters; and validating the first plurality of sensitivity parameters based on the estimated force. The force sensing circuitry is configured to detect force by way of a gap determination, the method further comprising: determining an initial zero offset vector for the trackpad, the initial zero offset vector corresponding to an initial gap of the trackpad; and providing the initial zero offset vector to the force sensing circuitry. The method further includes: after use of the trackpad involving the initial zero offset vector, determining that the trackpad satisfies a resting condition; after determining that the trackpad satisfies the resting condition, determining an updated zero offset vector for the trackpad; and providing the updated zero offset vector to the force sensing circuitry. The resting condition comprises that a substrate of the trackpad is at rest and that the substrate is not being touched by any physical object. The trackpad includes an accelerometer, further comprising using the accelerometer to determine that the substrate of the trackpad is at rest. The trackpad includes touch sensing circuitry, further comprising using the touch sensing circuity to determine that the substrate is not being touched by any physical object.

In a second aspect, a non-transitory storage medium has stored therein instructions that when executed by a processor cause the processor to perform operations comprising: while a first object is placed at each of a first plurality of locations on a trackpad, registering respective first readings from each of a second plurality of force sensors of the trackpad, the first plurality greater than the second plurality; selecting a first plurality of sensitivity parameters for the trackpad based at least in part on the first readings; and providing the first plurality of sensitivity parameters to force sensing circuitry of the trackpad, the force sensing circuitry coupled to the second plurality of force sensors.

In a third aspect, a system includes: a processor; a memory; an enclosure; a trackpad coupled to the enclosure, the trackpad having a first plurality of locations; a second plurality of force sensors coupled to the trackpad, the first plurality greater than the second plurality; and force sensing circuitry coupled to the second plurality of force sensors, the force sensing circuitry having a first plurality of sensitivity parameters selected based at least in part on first readings registered from each of the second plurality of force sensors while a first object is at each of the first plurality of locations.

Implementations can include any or all of the following features. The force sensing circuitry is configured to detect force by way of a gap determination, wherein the force sensing circuitry includes an initial zero offset vector corresponding to an initial gap of the trackpad, and wherein the system is configured to determine an updated zero offset vector for the force sensing circuitry when the trackpad satisfies a resting condition. The system further includes an accelerometer, wherein the system uses the accelerometer to determine that the trackpad satisfies the resting condition. The system further includes touch sensing circuitry, wherein the system uses the touch sensing circuity to determine that the trackpad satisfies the resting condition.

DETAILED DESCRIPTION

This document describes examples of input/output devices, such as trackpads or touchpads, that have improved architectures for performing force detection and/or calibration thereof. In some implementations, force detection can be performed (e.g., to recognize that a user "clicks" using a finger or stylus), and the force detection can be calibrated in one or more ways. Such calibration can address one or more occurrences, including, but not limited to, unit-to-unit variations between touchpads, spatial non-uniformity in an individual touchpad, non-linearity in an individual touchpad, and/or mechanical deformation.

Trackpads and touchpads are mentioned herein as examples and can be considered synonymous. Either or both of these can feature a surface formed by a substrate (e.g., glass, metal and/or a synthetic material such as a polymer) intended to be touched by a user in order to make one or more inputs into a system based on the location(s). For example, the user can place one or more fingers and/or one or more other objects (e.g., a stylus) on the surface of the substrate to generate such input(s). In some implementations, more complex inputs can be recognized, including, but not limited to, gestures, sequences and/or patterns.

Position detection can be performed using any suitable technology. In some implementations, capacitive sensing is used. For example, the presence of a fingertip and/or a conductive stylus at or near the surface of the substrate can change the electrical capacitance of that portion of the substrate, and therefore be registered as an input. As such, while examples herein mention the user touching a substrate in order to make input, it may be sufficient to place an object sufficiently close to, without actually touching, the substrate. In some implementations, resistive sensing is used. For example, the presence of an object can alter the resistance of electrodes in or on the substrate, thereby facilitating recognition of the input.

An input device such as a trackpad can be used solely to allow the user to make input, or it can simultaneously or at other times perform one or more other functions as well. In some implementations, the trackpad can provide haptic output to the user, such as by displacing the substrate (e.g., in a vibration-like fashion) in a way that can be tactilely perceived by the user. In some implementations, the trackpad can also feature a display mechanism configured to output visual information to the user, in analogy to how a touchscreen operates. For example, and without limitation, trackpad technology described herein can be implemented as part of a touchscreen. Such a display can present information to the user, and the trackpad (which can occupy the same area as the display) can register user inputs (e.g., taps, selections and/or dragging of objects).

Figure 1:
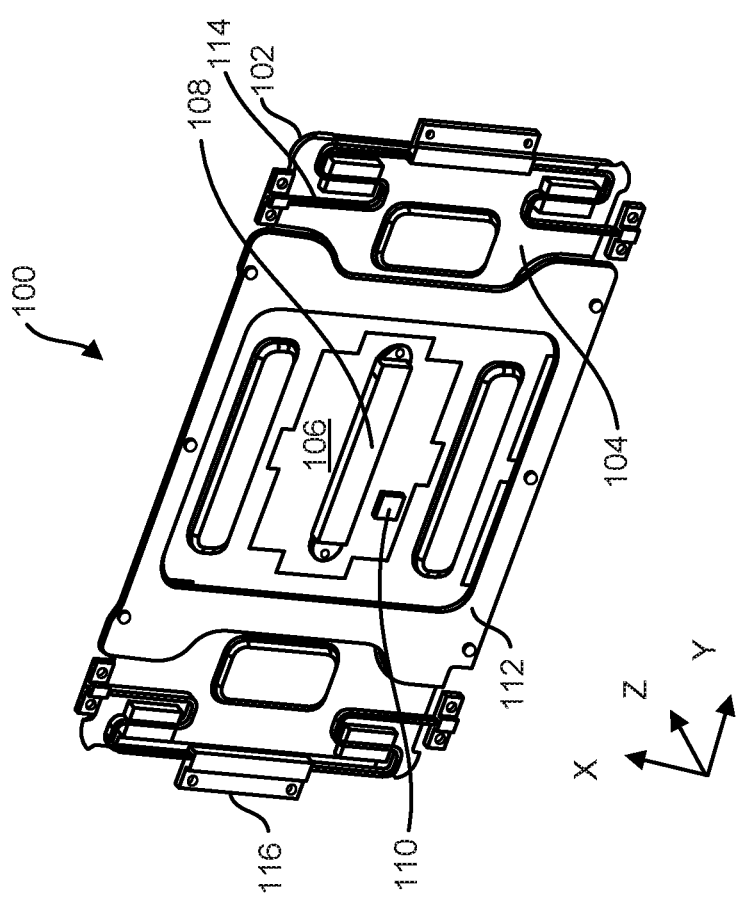
FIG. 1 shows a perspective view of an example of a trackpad for a computer system.

FIG. 1 shows a perspective view of an example of a trackpad 100 for a computer system. The trackpad 100 can be used with one or more other examples described herein. The trackpad 100 can be used with various types of computer systems. The trackpad 100 can be used with any of multiple types of electronic devices, including, but not limited to, a laptop computer, a tablet, a smartphone, or a wearable device, and combinations thereof. In some implementations, the trackpad 100 can be implemented in a device or system designed according to one or more examples described with reference to FIG. 13. For example, and without limitation, a mobile device, a smartphone, a tablet, a laptop, a personal computer, a wearable device, an appliance, a television, a vehicle, and/or another user electronic device can have the trackpad 100.

The trackpad 100 can be used for one or more types of input or output to a computer system. In some implementations, the trackpad 100 can serve as a pointing device regarding a graphical user interface (e.g., as presented on a display). A user can employ the trackpad 100 to move a cursor or other on-screen tool on a presented screen to manipulate one or more items, objects, files, windows, images or other forms of computer content. For example, the user can make an input relating to object selection, object de-selection, typing, editing, deletion, value selection and/or value de-selection regarding one or more screens presented in the graphical user interface.

Inputs can be made in one or more ways using the trackpad 100. Inputs can be made by sliding an object (e.g., a fingertip or the tip of a stylus) across the trackpad 100 in a form of gesture. Inputs can be made by pressing an object onto the trackpad 100 (e.g., in what may be called a "click" maneuver) to deflect the trackpad 100 in some direction. In such situations, it can be detected that force is applied to the trackpad 100 and one or more operations can be triggered in response to detecting the force. Here, a Cartesian coordinate system having respective x-, y-, and z-axes is shown for illustrative purposes. A touch surface of the trackpad 100 can extend primarily in the x- and y-directions (e.g., parallel to a plane defined by the x- and y-axes). For example, the object can be slid across the trackpad 100 in one or both of the x- or y-directions. As another example, the object pressed against the trackpad 100 can cause a deflection of at least part of the trackpad 100 in the z-direction, which may be perpendicular to the plane of the touch surface (e.g., a direction inward with regard to an electronic device).

The trackpad 100 can also or instead be used to provide one or more types of output from the computer system. The trackpad 100 can provide tactile sensation that is perceptible to the user, in order to communicate one or more types of feedback.

The trackpad 100 includes a substrate 102 that can form a majority of the physical implementation of the trackpad 100. The substrate 102 can be made of any material having a sufficient stiffness considering the intended input (e.g., sliding or pressing of the object(s)) and/or considering the intended output (e.g., mechanical motion conveyed through the trackpad 100 as part of haptic output to a user). For example, the substrate 102 can be made at least in part of metal.

The trackpad 100 can include a front surface on the substrate 102, which is facing away in the present illustration. The front surface can be designed for touch sensing and can face outward (e.g., toward the user) on an electronic device where the trackpad 100 is implemented. For example, when the trackpad 100 is implemented in a laptop computer that is currently being used on a tabletop surface, the front surface can presently be directed substantially upward. The front surface can include any material that is suitable considering the intended input and/or output. For example, the front surface can include glass, metal, and/or a polymer material. The front surface can provide for touch sensing as part of the exemplary input mentioned above regarding sliding of an object in a gesture on the front surface. As such, the front surface can include touch-sensitive technology. For example, capacitive and/or resistive touch sensing can be provided in the trackpad 100.

The trackpad 100 can include a rear surface 104 on the substrate 102. The rear surface 104 can face inward (e.g., away from the user) at an electronic device where the trackpad 100 is implemented. For example, when the trackpad 100 is implemented in a laptop computer that is currently being used on a tabletop surface, the rear surface 104 can presently be directed substantially downward. The rear surface 104 can be the location where some or all functional components of the trackpad 100 are installed, for example as will be described.

The trackpad 100 can include one or more components of circuitry in order to perform input and/or output operations. In examples described herein, circuitry can be implemented by way of hardware designed and arranged to form one or more circuits configured to perform the required task(s), or as at least one processor executing instructions stored in a storage medium. Here, a printed circuit board (PCB) 106 is positioned on the rear surface 104. The PCB 106 can include components or other circuitry responsible for performing one or more functions relating to the trackpad 100. For example, the PCB 106 can include a microcontroller that manages touch sensing, force sensing, and/or haptic output.

The trackpad 100 can include one or more components configured to generate output. Haptic output can be generated using the trackpad 100. In some implementations, an actuator 108 is positioned on the trackpad 100. In some implementations, the actuator 108 can be an electromagnetic actuator. For example, the actuator 108 can be a linear resonant actuator (LRA) in which electromagnetic interaction between a coil and a magnet causes a certain mass (sometimes referred to as the moving mass) to gain velocity and be displaced in a way that can be perceived by a user. The actuator 108 can be mounted to the rear surface 104 and/or to the PCB 106.

The trackpad 100 can include one or more sensors. Here, an accelerometer 110 is positioned on the trackpad 100. For example, the accelerometer 110 can be mounted to the rear surface 104. The accelerometer 110 can sense and measure the acceleration to which it is being subjected, and can output one or more signals correspondingly. In some implementations, the accelerometer 110 is configured to sense acceleration in multiple dimensions and generate the corresponding output signal(s). For example, the accelerometer 110 can be a three-dimensional accelerometer.

The trackpad 100 can include a plate 112 that can be involved in detecting a click or another force input on the trackpad 100. The trackpad 100 can operate based on inductive force sensing or inductive gap sensing based on force. In some implementations, the plate 112 can serve as, or have mounted thereon, a coil that is involved in detecting deflection of the trackpad 100 as a result of applied force. The trackpad 100 can operate based on capacitive force sensing or capacitive gap sensing based on force. In some implementations, the plate 112 can serve as, or have mounted thereon, a capacitive plate that is involved in detecting deflection of the trackpad 100 as a result of applied force. As such, a gap determination can be performed to sense an applied force.

The trackpad 100 can include a spring 114 that is involved in the suspension of the substrate 102 in its operating position. In some implementations, the spring 114 facilitates the detection of force applied to the front surface by way of allowing deflection of the substrate 102. For example, the spring 114 can allow the substrate 102 to be deflected in the z-direction.

One or more damping materials can be provided for the motion/deflection of the trackpad 100. In some implementations, silicone pads can be provided on the rear surface 104. For example, the silicone pads can be covered by an over-molded plastic.

The trackpad 100 can have one or more structures for mounting the trackpad 100 to a computer system such as an electronic device. In some implementations, the trackpad 100 has structures 116 that can facilitate assembly of the trackpad 100 at a housing or another part of such system. For example, the structure 116 can be mounted on respective opposite edges of the substrate 102.

Figure 2:
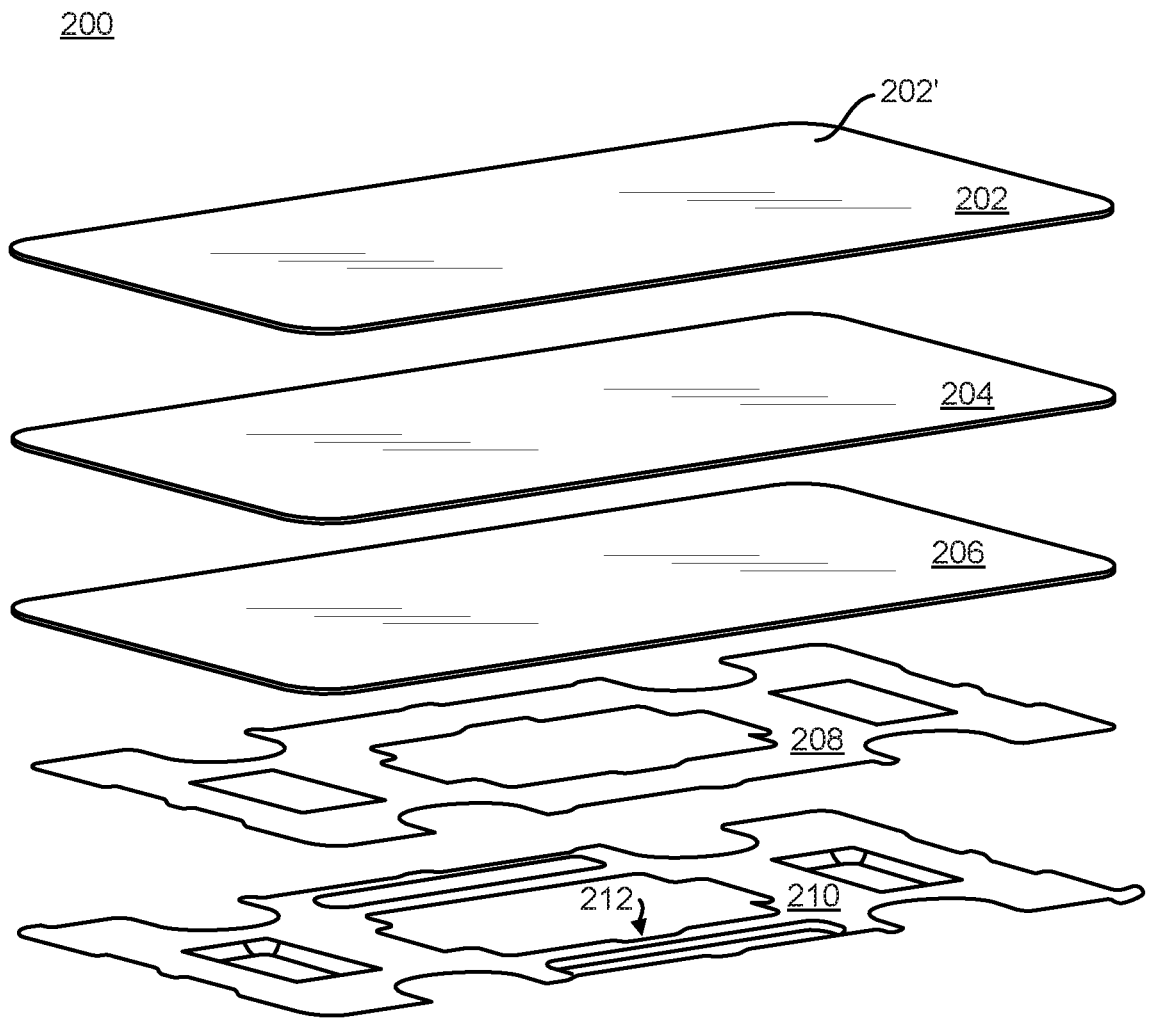
FIG. 2 shows an exploded view of an example of a trackpad architecture.

FIG. 2 shows an exploded view of an example of a trackpad architecture 200. The exploded view illustrates exemplary components somewhat separated from each other for purposes of clarity, with such components being assembled into a functioning assembly in an operative implementation. The trackpad architecture 200 can be used in any or all examples described herein. For example, the trackpad architecture 200 can be implemented in one or more devices exemplified below with reference to FIG. 13. For example, and without limitation, a mobile device, a smartphone, a tablet, a laptop, a personal computer, a wearable device, an appliance, a television, a vehicle, and/or another user electronic device can have the trackpad architecture 200.

The trackpad architecture 200 includes a substrate 202 with a surface 202' that can be intended to be facing toward a user. For example, the surface 202' can be accessible to the user, such as for operation using the finger(s) and/or an object such as a stylus. In some implementations, the surface 202' can serve as the front surface of the substrate 102 in FIG. 1. In some implementations, the substrate 202 can include metal, polymer, and/or glass. For example, soda lime glass can be used. The substrate 202 can be treated in one or more ways. For example, the surface 202' can be sandblasted. The substrate 202 can be transparent, partially transparent, partially opaque, or opaque. In some implementations, the surface opposite the surface 202' can be treated in one or more ways. For example, a material (e.g., ink and/or epoxy) can be applied (e.g., by a printing process, such as by silkscreen printing).

The trackpad architecture 200 can include a layer 204. For example, the layer 204 can be applied to some or all of the surface of the substrate 202 that is opposite the surface 202'. In some implementations, the layer 204 is at least in part adhesive. Any suitable type of adhesive can be used. For example, the layer 204 can include a pressure-sensitive adhesive. As another example, the layer 204 can include a heat-activated film.

The trackpad architecture 200 can include a circuit board 206 for detecting a position of an object adjacent the substrate 102. The circuit board 206 can include electrical or electronic components, and connections between them, for sensing the contact or the proximate presence of an object such as the user's finger(s) and/or a stylus, and to generate a corresponding position signal. For example, capacitive and/or resistive sensing can be used for the sensing. In some implementations, the circuit board 206 can serve as the circuit board 106 of the trackpad 100 in FIG. 1. A position signal can be used for one or more purposes by a system. The position signal can cause one or more actions to be performed, and/or one or more actions to be inhibited, in the system. For example, and without limitation, the position signal can select an object, move an object, generate a sound, and/or switch a device into a different state (e.g., on or off).

In some implementations, the circuit board 206 includes electrical or electronic components, and connections between them, for sensing the force applied by the contact of an object such as the user's finger(s) and/or a stylus with the substrate 202, and to generate a corresponding force signal. The force sensing can be based on inductive measurement by way of one or more inductive elements positioned on or within the circuit board 206. For example, the change in inductance as a result of displacement of at least the circuit board 206 relative to another component of the system (e.g., a target plate or a housing of a device implementing the system) may be determined. The force sensing can be based on capacitive measurement by way of one or more capacitive elements positioned on or within the circuit board 206. For example, the change in capacitance as a result of displacement of at least the circuit board 206 relative to another component of the system (e.g., a target plate or a housing of a device implementing the system) may be determined. The force sensing can be done using a force sensing circuit that detects force applied to the substrate 202 using the inductive and/or capacitive element(s). In some implementations, the circuit board 206 can include a PCB, sometimes referred to as a PCB assembly (PCBA).

The generated force signal(s) can be used for one or more purposes by a system. The force signal can cause one or more actions to be performed, and/or one or more actions to be inhibited, in the system. For example, and without limitation, the force signal can be recognized by the system as a click or tap, and the appropriate action(s) can be taken in response. In some implementations, the force signal(s) can be used in one or more calibration procedures. For example, calibration can serve to configure force sensing circuitry to properly detect force and generate the correct output. As another example, calibration can serve to account for and counteract changes that may occur during use or after a period of use, to ensure a consistent user experience in line with design specifications.

The layer 204 can contact at least one of the substrate 202 or the circuit board 206. In some implementations, the layer 204 serves at least in part for assembling the substrate 202 to the circuit board 206.

The trackpad architecture 200 can include a layer 208. In some implementations, the layer 208 is at least in part adhesive. Any suitable type of adhesive can be used. For example, the layer 208 can include a pressure-sensitive adhesive. As another example, the layer 208 can include a heat-activated film.

The trackpad architecture 200 can include a stiffener plate 210 to provide structural integrity to the circuit board 206 and/or to the substrate 202. For example, the stiffness can counteract any force that is applied as part of a user touching or pressing on the substrate 202. As such, in an implementation that includes the stiffener plate 210, the circuit board 206 and/or the substrate 202 need not be made as stiff as they otherwise might have been. The stiffener plate 210 can be made of metal. In some implementations, the stiffener plate 210 includes steel. For example, stainless steel can be used. In some implementations, the stiffener plate 210 includes aluminum. For example, an aluminum alloy can be used. The stiffener plate 210 can be stamped from material stock (e.g., a sheet of metal). The stiffener plate 210 can have one or more openings. In some implementations, an opening 212 can be provided in the stiffener plate 210. For example, the opening 212 can accommodate a haptic feedback component (e.g., as mounted to the circuit board 206).

The layer 208 can contact at least one of the circuit board 206 or the stiffener plate 210. In some implementations, the layer 208 serves at least in part for assembling the stiffener plate 210 to the circuit board 206.

The trackpad architecture 200 can include one or more grounding elements. In some implementations, the trackpad architecture 200 includes grounding elements that electrically connect the stiffener plate 210 and the circuit board 206 to each other.

Force sensing regarding the trackpad architecture 200 can be done based on detecting a change in separation between one or more components of the trackpad architecture 200 and a conductive element (not shown). For example, the conductive element can include a target plate substantially parallel to the trackpad architecture 200 so that a change in a separation between the target plate and the trackpad architecture 200 can be detected. As another example, the conductive element can include part of the housing of an electronic device using the trackpad architecture 200, the part of the housing being substantially parallel to the trackpad architecture 200 so that a change in a separation between the part of the housing and the trackpad architecture 200 can be detected.

Figure 3:
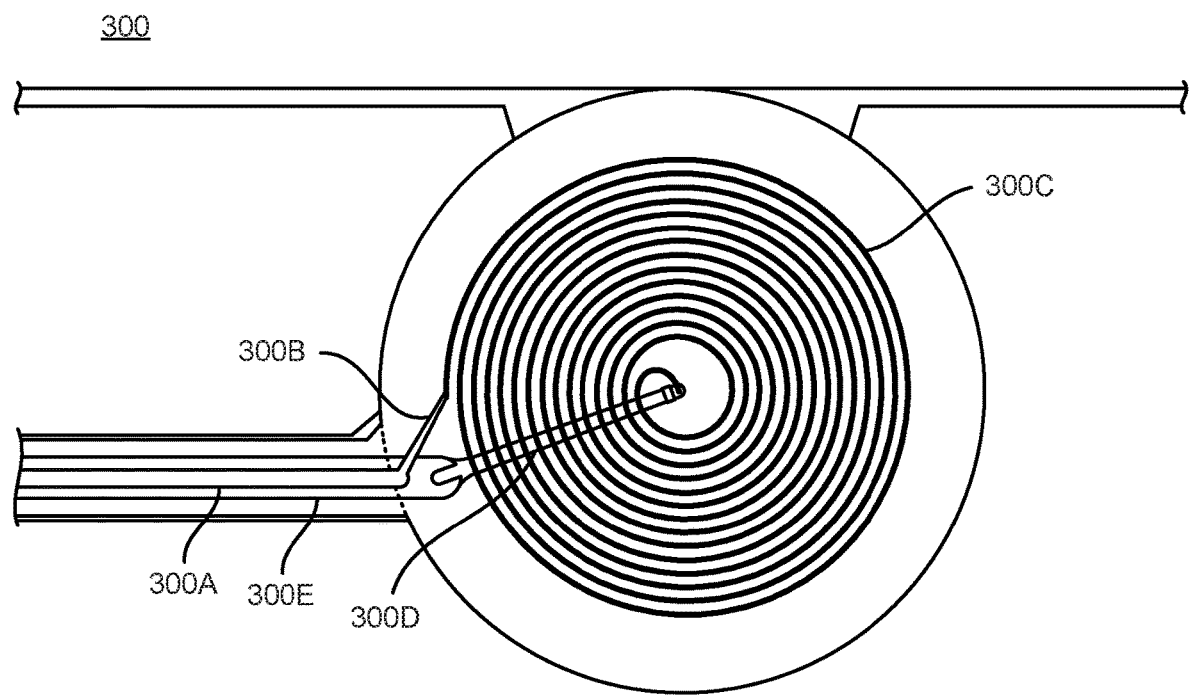
FIG. 3 shows an example of an inductive element.

FIG. 3 shows an example of an inductive element 300. The inductive element 300 is shown in a plan view. The inductive element 300 may be implemented on the surface (e.g., somewhat embedded into the surface) of a circuit board (not shown). The inductive element 300 can be used with one or more other examples described herein, e.g., it can be used in connection with the trackpad 100 in FIG. 1 and/or with the trackpad architecture 200 in FIG. 2. For example, the inductive element 300 can be implemented in one or more of the devices described with reference to FIG.

13 below. Some components have been omitted for purposes of clarity (including, but not limited to, a circuit board and a stiffener board).

The inductive element 300 includes a connector 300A, which makes a turn and forms a portion 300B, a spiral portion 300C, a portion 300D, and a connector 300E. Compare, for example, with the description of the inductive element 402 in FIG. 4. The connectors 300A and 300E can serve to connect the inductive element 300 to another component (not shown). In some implementations, the connectors 300A and 300E can connect the inductive element 300 to a remainder of a force sensing circuit. For example, alternating current (AC) can be applied to the inductive element 300 by way of the connectors 300A and 300E. In some implementations, the inductive element 300 can be fabricated directly on the circuit board. In some implementations, the inductive element 300 can comprise a planar spiral. For example, the planar spiral can be positioned flat against a main surface of the circuit board. The geometry of the inductive element 300 can be adjusted for different applications and/or to take into account different constraints on the implementation.

Figure 4:
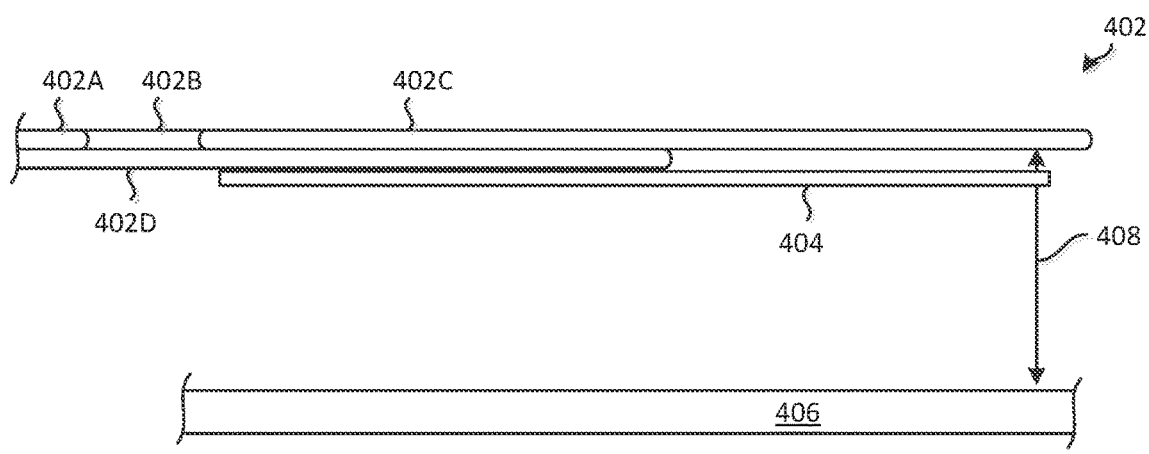
FIG. 4 schematically shows a side view of part of a trackpad to exemplify force sensing by inductive measurement.

FIG. 4 schematically shows a side view of part of a trackpad 400 to exemplify force sensing by inductive measurement. The trackpad 400 can be used with one or more other examples described herein. For example, the trackpad 400 can be implemented in one or more of the devices described with reference to FIG. 13 below. The trackpad 400 includes an inductive element 402, a protective layer 404, and a target plate 406. Some components have been omitted for purposes of clarity (including, but not limited to, a circuit board and a substrate). The target plate 406 can be a separate component, or can be a portion of another component, including, but not limited to, a housing or other body of an electronic device where the trackpad 400 is implemented.

The inductive element 402 includes a connector 402A, which makes a turn and forms a portion 402B, a spiral portion 402C, and a connector 4002D. The connectors 402A and 402D can serve to connect the inductive element 402 to another component (not shown). For example, the connector 402D can originate in the center of the spiral portion 402C and extend toward the connector 402A. The connectors 402A and 402D are electrically isolated from each other. One of the connectors 402A and 402D can be considered as forming the beginning of the inductive element 402, and the other of the connectors 402A and 402D can be considered as forming the end of the inductive element 402. The inductive element 402 can be made from any suitable electrically conductive material. In some implementations, the inductive element 402 is formed from a material associated with the circuit board. For example, the inductive element 402 can be formed from copper trace as part of the process of fabricating or otherwise manufacturing the circuit board. More than one inductive element can be formed on a circuit board. For example, multiple inductive elements may be substantially identical to each other in design, or two or more inductive elements may have different geometries.

In some implementations, the connectors 402A and 402D can connect the inductive element 402 to a remainder of a force sensing circuit. For example, AC can be applied to the inductive element 402 by way of the connectors 402A and 402D. The protective layer 404 can serve as protection for the inductive element 402. For example, the protective layer 404 can include a substantially non-inductive material that covers the inductive element 402 from contamination or other interference.

The trackpad 400 can include the inductive element 402 to provide an inductive sensing mechanism for force detection. In operation, an AC field can be generated by the inductive element 402. The AC field can induce eddy currents in or on the target plate 406. The eddy currents give rise to a magnetic field that opposes the magnetic field of the inductive element 402. Particularly, the reduction of the inductance can depend on a distance 408 between the inductive element 402 and the target plate 406. In some implementations, the distance 408 can be referred to as a gap. The distance 408 can represent a nominal gap that has a predetermined length (e.g., within a certain tolerance) at the time of assembly or calibration. As such, when the distance 408 changes—such as due to a force being applied to the substrate of the trackpad 400—the force sensing circuit can sense the force by way of detecting the change in inductance. The geometry of the inductive element 402 (e.g., of the connector 402A, the portion 402B, the spiral portion 402C, and/or the connector 402D) can be altered to effectuate scaling of the design solution.

Figure 5B:
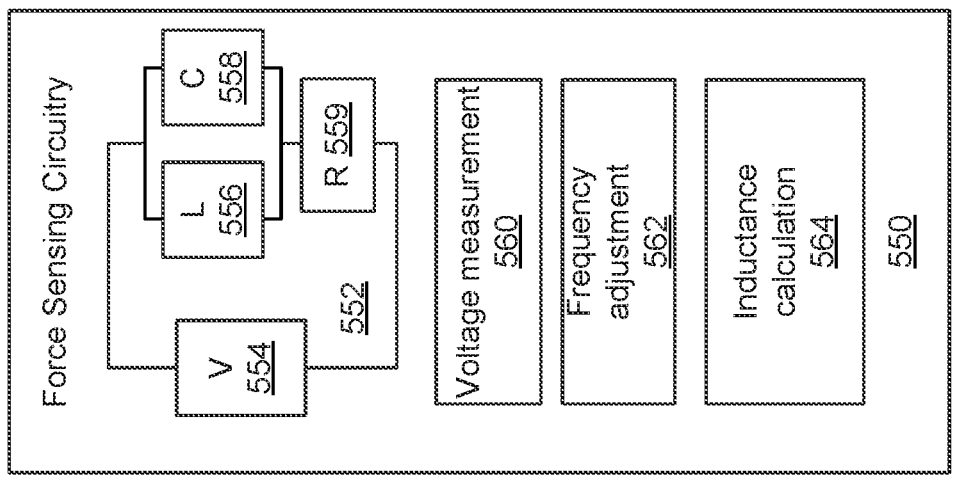
FIGS. 5A-B show examples of force sensing circuitry.
Figure 5A:
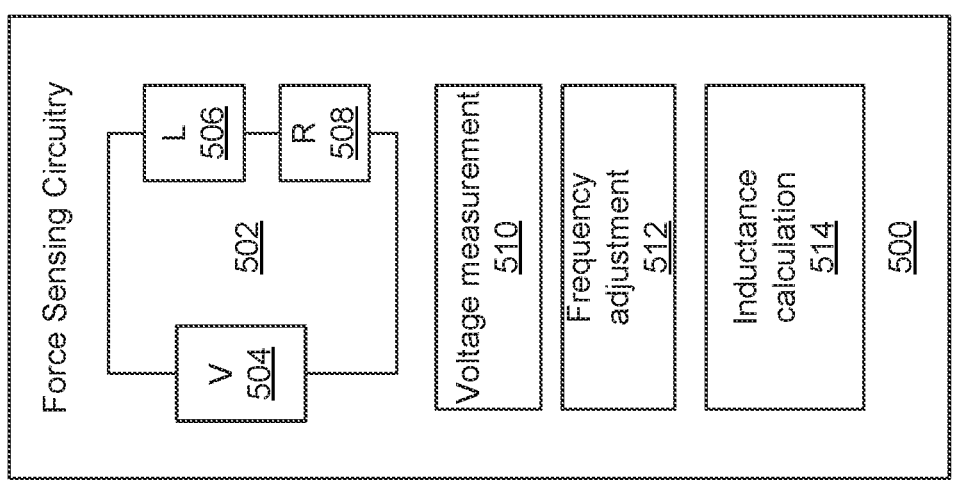

FIG. 5A shows an example of force sensing circuitry 500. The force sensing circuitry 500 can be used with one or more other examples described herein, e.g., it can be used in connection with the trackpad 100 in FIG. 1, or trackpad architecture 200 in FIG. 2. For example, the force sensing circuitry 500 can be implemented in one or more of the devices described with reference to FIG. 13 below.

The force sensing circuitry 500 includes a circuit 502 that has at least a voltage source 504 (labeled V), an inductance 506 (labeled L), and a resistance 508 (labeled R). The voltage source 504, inductance 506, and resistance 508 are electrically connected to each other in series as indicated to complete the circuit 502. The inductance 506 is the inductance that is the subject of the force sensing (e.g., the (varying) inductance of the inductive element 402 in FIG. 4). The resistance 508 may be a known resistance. For example, the resistance 508 may be the resulting resistance of the component(s) located between the inductance 506 and ground.

In operation, the voltage source 504 may provide voltage to the circuit 502 in form of AC. A voltage measurement component 510 (e.g., one or more chips or other integrated circuit (IC) components), may measure voltage at the junction between the inductance 506 and the resistance 508. For example, the voltage measurement component 510 can be a digital component that outputs a signal in form of counts, wherein the counts represent the measured voltage. A frequency adjustment component 512 (e.g., one or more chips or other IC components) can adjust the frequency of the voltage applied by voltage source 504 until the measured voltage is half of the input voltage. For example, the frequency adjustment component 512 can determine the counts output by the voltage measurement component 510 and adjust the frequency accordingly. An inductance calculation component 514 (e.g., one or more chips or other IC components) can calculate the inductance 506 as a function of the resistance 508 and the adjusted frequency of the voltage source 504. For example, the inductance 506 may then be directly proportional to the resistance 508 and inversely proportional to the frequency.

FIG. 5B shows an example of force sensing circuitry 550. The force sensing circuitry 550 can be used with one or more other examples described herein, e.g., it can be used in connection with the trackpad 100 in FIG. 1, or the trackpad architecture 200 in FIG. 2. For example, the force sensing circuitry 1350 can be implemented according to one or more examples described with reference to FIG. 13 below.

The force sensing circuitry 550 includes a circuit 552 that has at least a voltage source 554, an inductance 556, a capacitance 558 (labeled C), and a resistance 559 (labeled R). The inductance 556 and the capacitance 558 are coupled in parallel. The voltage source 554, the parallel coupling of the inductance 556 and the capacitance 558, and the resistance 559 are electrically connected to each other in series as indicated to complete the circuit 552. The inductance 556 is the inductance that is the subject of the force sensing (e.g., the (varying) inductance of the inductive element 402 in FIG. 4). The capacitance 558 may be a known capacitance. The resistance 559 may be a known resistance. For example, the resistance 559 may be the resulting resistance of the component(s) located between the parallel coupling of the inductance 556 and the capacitance 558 and ground.

In operation, the voltage source 554 may provide voltage to the circuit 552 in form of AC. A voltage measurement component 560 (e.g., one or more chips or other IC components), may measure voltage at the junction between the resistance 559 and the parallel coupling of the inductance 556 and the capacitance 558. For example, the voltage measurement component 560 can be a digital component that outputs a signal in form of counts, wherein the counts represent the measured voltage. A frequency adjustment component 562 (e.g., one or more chips or other IC components) can adjust the frequency of the voltage applied by voltage source 554 until the measured voltage shows a maximum response, corresponding to the resonant point of the parallel coupling of the inductance 556 and the capacitance 558. For example, the frequency adjustment component 562 can determine the counts output by the voltage measurement component 560 and adjust the frequency accordingly. An inductance calculation component 564 (e.g., one or more chips or other IC components) can calculate the inductance 556 as a function of the capacitance 558 and the adjusted frequency of the voltage source 554. For example, the inductance 556 may then be inversely proportional to both the capacitance 558 and the frequency.

Figure 6:
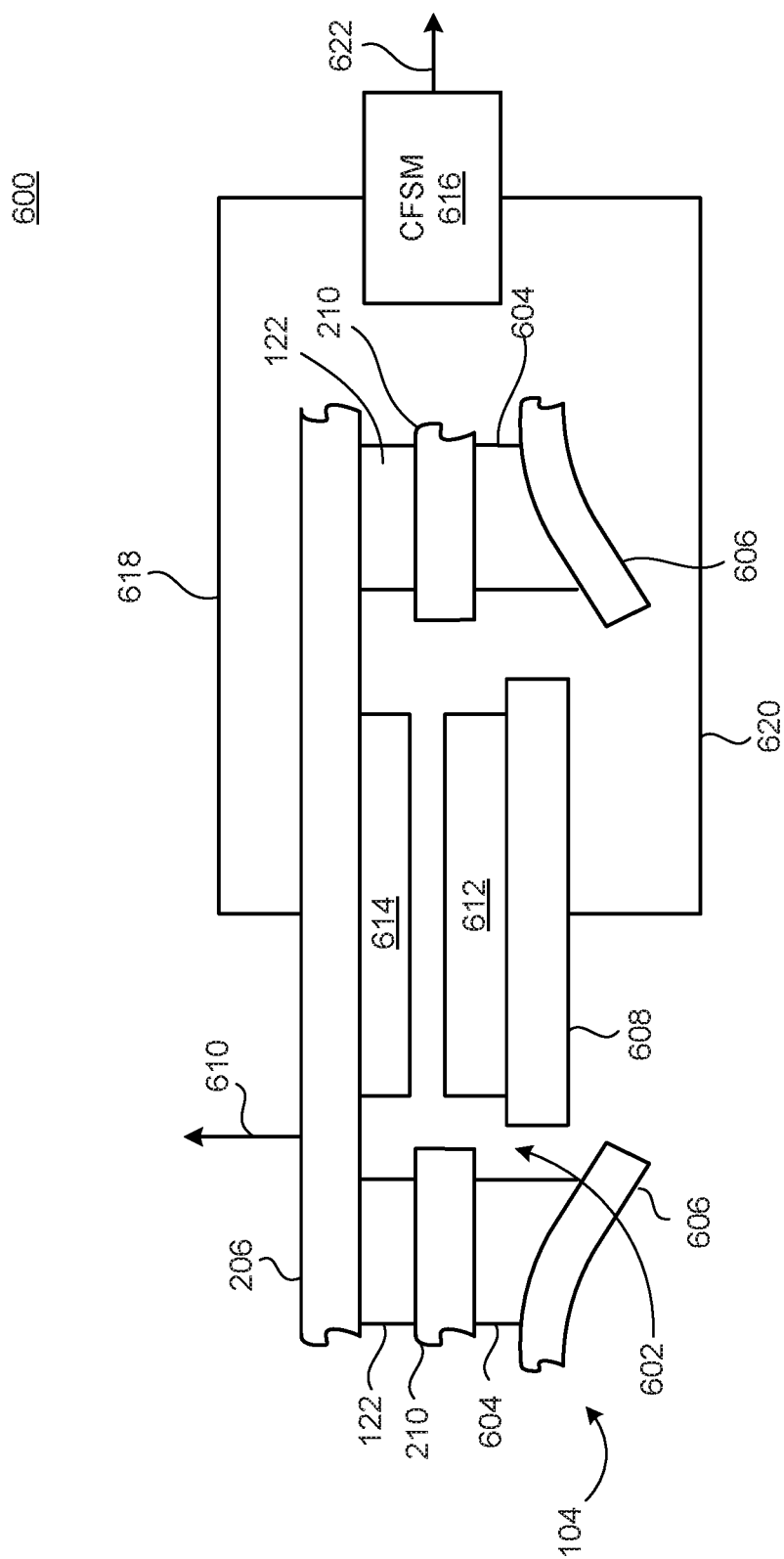
FIG. 6 shows an example of a trackpad architecture with on-PCBA capacitive force sensing.

FIG. 6 shows an example of a trackpad architecture 600 with on-PCBA capacitive force sensing. The trackpad architecture 600 can be implemented in any trackpad described herein, including, but not limited to, the trackpad 100 in FIG. 1 or the trackpad architecture 200 in FIG. 2. Some aspects of the trackpad architecture 200 will be used for exemplification. The trackpad architecture 600 is truncated for simplicity. As such, in an implementation some features can extend further than shown in the illustration.

The trackpad architecture 600 includes the circuit board 206. For example, the circuit board 206 can be a PCBA.

The trackpad architecture 600 includes the stiffener plate 210 mounted to the circuit board 206 by the layer 208. An opening 602 is formed in the stiffener plate 210.

The trackpad architecture 600 includes discs 604 between the stiffener plate 210 and a target plate. The target plate is here not shown in its entirety but may include spring elements 606 and a portion 608. The spring elements 606 of the target plate or another conductive member are currently shown in a flexed state, whereas the portion 608 of the target plate is not currently flexed (e.g., the portion 608 is not a spring element). The flexing can be due to a pressure applied to a substrate (not shown) which causes the circuit board 206 and the stiffener plate 210 to press against the discs 604, thereby partially compressing the discs 604. When the spring elements 606 are not flexed, the spring elements 606 may essentially align with the portion 608.

In operation, the circuit board 206 can detect the position of an object (e.g., a finger or a stylus) relative to the trackpad and generate a position signal 610. The position signal 610 is here schematically illustrated as an arrow and can be used for one or more purposes in a system having a trackpad with the trackpad architecture 600. For example, a cursor on a screen can be positioned corresponding to the detected position(s).

The trackpad architecture 600 can facilitate capacitive force sensing. A dielectric 612 can be placed between the portion 608 of the target plate and a pad 614 on the circuit board 206. For example, the dielectric 612 can be mounted to the portion 608. A capacitive force sensing module (CFSM) 616 in the trackpad architecture 600 can have a connection 618 to the pad 614, and a connection 620 to the portion 608. The CFSM 616 can be implemented using one or more chips or other IC components. The CFSM 616 can detect a capacitance of the pad 614 and the target plate (e.g., at least partly the portion 608), and can generate a force signal 622. In some implementations, the force signal 622 can represent detection of a force onto the substrate (not shown) causing displacement of the pad 614. For example, the force signal 622 can be used for triggering one or more operations in the system.

Figure 7:
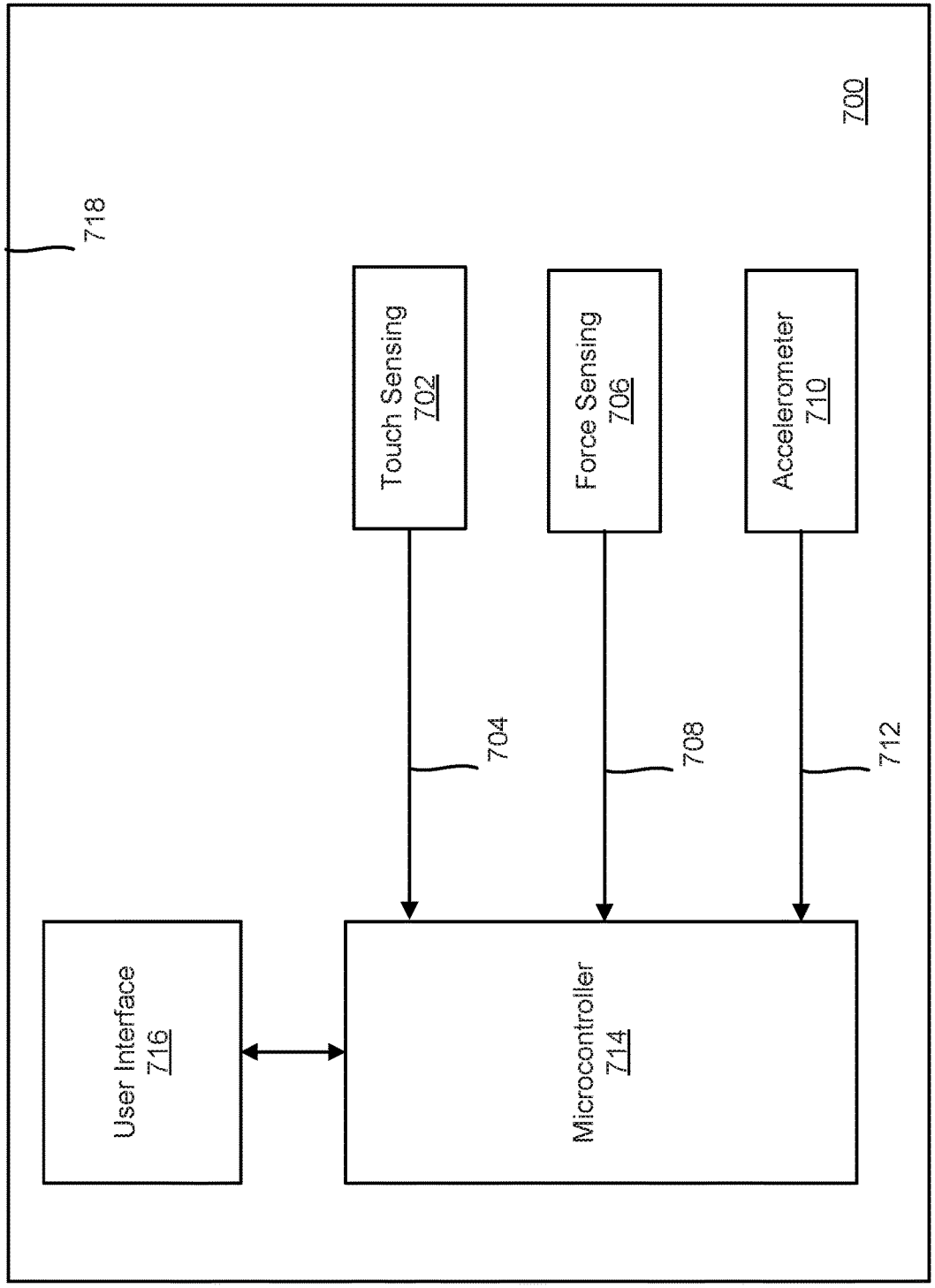
FIG. 7 schematically shows a computer system that can be used for sensing of force and/or touch on a trackpad.

FIG. 7 schematically shows a computer system 700 that can be used for sensing of force and/or touch on a trackpad. The computer system 700 can be used with one or more other examples described herein. For example, the computer system 700 can be implemented according to one or more examples described with reference to FIG. 13 below. Components of the computer system 700 can operate identically or similarly to corresponding components described in other examples herein. One or more of the components of the computer system 700 can be implemented as separate unit, or as part of an integrated unit together with at least one component.

The computer system 700 includes touch sensing circuitry 702. In some implementations, the touch sensing circuitry 702 facilitates the user making inputs by placing an object near or in contact with a surface of the trackpad, or making a gesture (e.g., by sliding an object along the surface) or by applying force (e.g., by pressing with an object). The touch sensing circuitry 702 is coupled to one or more other aspects of the computer system 700, and such input(s) to the touch sensing circuitry 702 can trigger generating of at least one signal 704. For example, the signal 704 represents, or may otherwise characterize, the placement and/or gesture that was input using the touch sensing circuitry 702.

The computer system 700 includes force sensing circuitry 706. In some implementations, the force sensing circuitry 706 facilitates the user making inputs by applying force to a surface of the trackpad (e.g., by tapping on or pressing against the surface). The force sensing circuitry 706 is coupled to one or more other aspects of the computer system 700, and such input(s) to the force sensing circuitry 706 can trigger generating of at least one signal 708. For example, the signal 708 represents, or may otherwise characterize, the force input using the force sensing circuitry 706.

The computer system 700 includes an accelerometer 710. In some implementations, the accelerometer 710 facilitates detection of movement of at least part of the trackpad. For example, such movement detection can be used to facilitate feedback on haptic output generated using the trackpad, and/or for another purpose. The accelerometer 710 is coupled to one or more other aspects of the computer system 700, and can generate at least one signal 712. The signal 712 represents, or may otherwise characterize, the present acceleration, if any, of the trackpad. For example, the signal 712 can include a three-dimensional characterization of detected acceleration.

The computer system 700 includes a microcontroller 714. The microcontroller 714 includes at least: one or more processor cores, one or more memories, and one or more input/output components that allow the microcontroller 714 to communicate with other aspects of the computer system 700. In some implementations, the microcontroller 714 is implemented as part of a PCB in an electronic device. For example, the microcontroller 714 can be mounted on a trackpad that is configured for sensing touch and force.

In some implementations, the microcontroller 714 can be characterized as an "always-on processor." For example, the microcontroller 714 can always be receptive to inputs using the touch sensing circuitry 702 and/or the force sensing circuitry 706 regardless of the state of the computer system 700 or the state of the electronic device where the computer system 700 may be implemented.

The microcontroller 714 can perform functions regarding the detection of touch input and force input, as well as calibration of the trackpad. The computer system 700 includes a user interface 716 that can be employed for user configuration of one or more aspects of the touch detection, force detection, and/or calibration. The user interface 716 can be coupled to the microcontroller 714 directly or indirectly. For example, aspects of the user interface 716 that involve presenting content on a display, and receiving inputs facilitated by the presented content, can be handled by a main processing unit for the electronic device or other apparatus where the computer system 700 is implemented (see, e.g., FIG. 13), and that main processing unit can couple to the microcontroller 714 to facilitate the necessary input and/or output.

The computer system 700 can be included in an enclosure 718. For example, the enclosure 718 can include a housing such as a rigid structure (e.g., of metal and/or polymer material) that houses components of the computer system 700.

Figure 8:
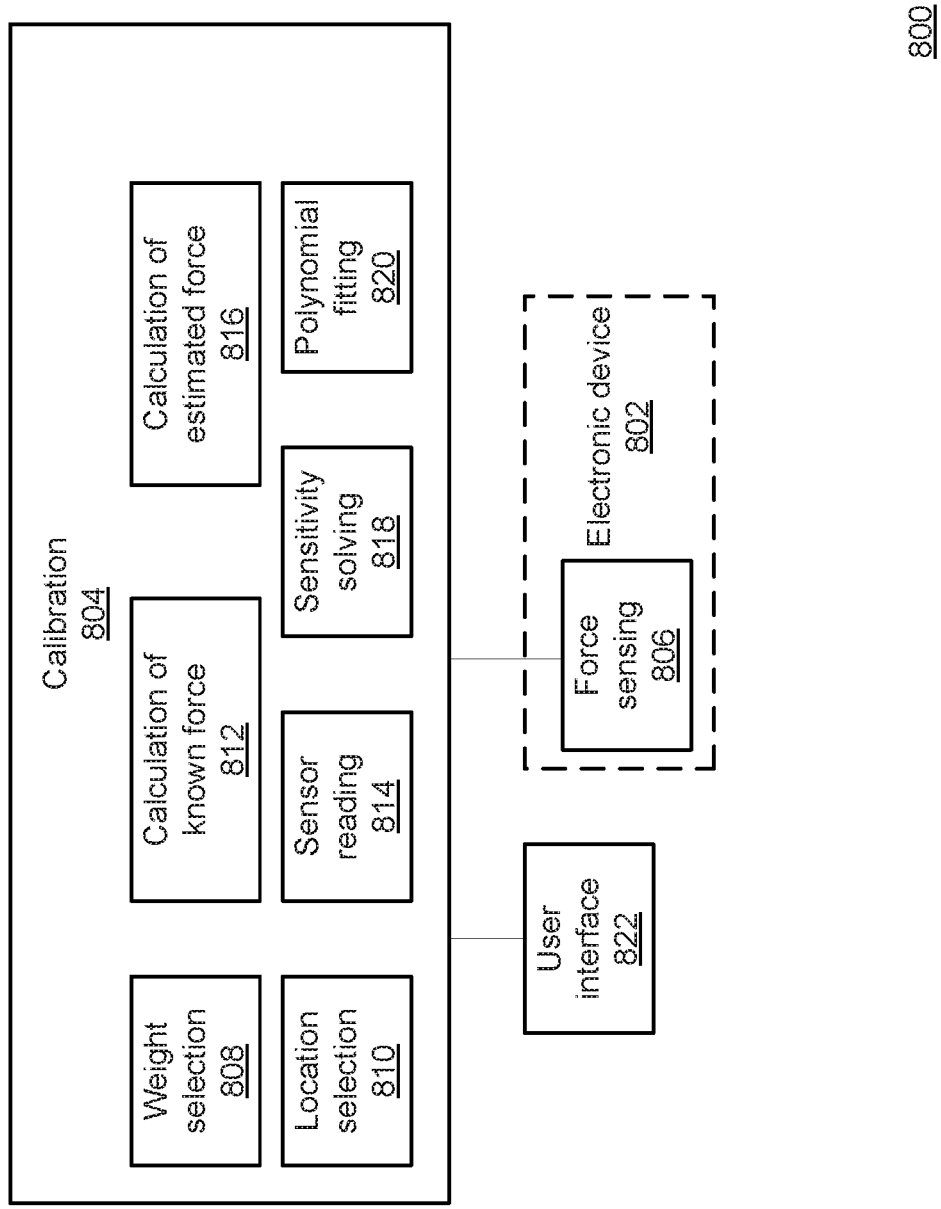
FIG. 8 shows an example of a system that can be used for calibrating an electronic device.

FIG. 8 shows an example of a system 800 that can be used for calibrating an electronic device 802. The system 800 can be used in any or all examples described herein. For example, the system 800 can be implemented in one or more devices exemplified below with reference to FIG. 13.

The system 800 can include calibration circuitry 804. For example, the calibration circuitry 804 can be used for determining one or more sensitivity parameters for force sensing circuitry 806 of the electronic device 802.

The system 800 can include weight selection circuitry 808. For example, the weight selection circuitry 808 can be used for choosing one or more weights among a predefined group of weights, for purposes of a calibration process.

The system 800 can include location selection circuitry 810. For example, the location selection circuitry 810 can be used for choosing one or more locations among a predefined group of locations on a trackpad, for purposes of a calibration process.

The system 800 can include calculation circuitry 812 regarding a known force. For example, the calculation circuitry 812 can be used to calculate the gravitational force from the weight(s) selected using the weight selection circuitry 808.

The system 800 can include sensor reading circuitry 814. For example, the sensor reading circuitry 814 can be used to obtain readings registered by one or more force sensors of the force sensing circuitry 806 at the electronic device 802.

The system 800 can include calculation circuitry 816 regarding an estimated force. For example, the calculation circuitry 816 can be used to estimate the gravitational force based on the reading(s) obtained using the sensor reading circuitry 814. For example, a force F can in principle be estimated using one or more readings D and one or more sensitivity parameters S as follows:

$$F = S*D,$$

where the force F may be measured in Newton or an equivalent unit, the reading D may be measured in a unit that represents to detected gap in the trackpad, such as a number of counts by a digital detector, and the sensitivity parameter S may have a unit of Newton per counts. That is, by multiplying the obtained sensor output with the selected sensitivity parameter, the estimated force is obtained.

A sensitivity parameter can be selected for each of multiple force sensors. In some implementations, the number of force sensors is m, where m is a positive integer. The force can then be estimated as follows:

$$F = [S_1 \ \ldots \ S_m] \cdot \begin{bmatrix} D_1 \\ \vdots \\ D_m \end{bmatrix}.$$

The system 800 can include sensitivity solving circuitry 818. For example, the sensitivity solving circuitry 818 can be used to select one or more sensitivity parameters for the calculation circuitry 816.

The system 800 can include polynomial fitting circuitry 820. For example, the polynomial fitting circuitry 820 can be used to fit two or more sets of sensitivity parameters to each other for use in the force sensing circuitry 806.

The system 800 can include user interface 822. For example, the user interface 822 can be used to instruct a user which weight to select based on an output of the weight selection circuitry 808, and/or to instruct the user at which location the weight should be placed based on an output of the location selection circuitry 810.

Figure 9:
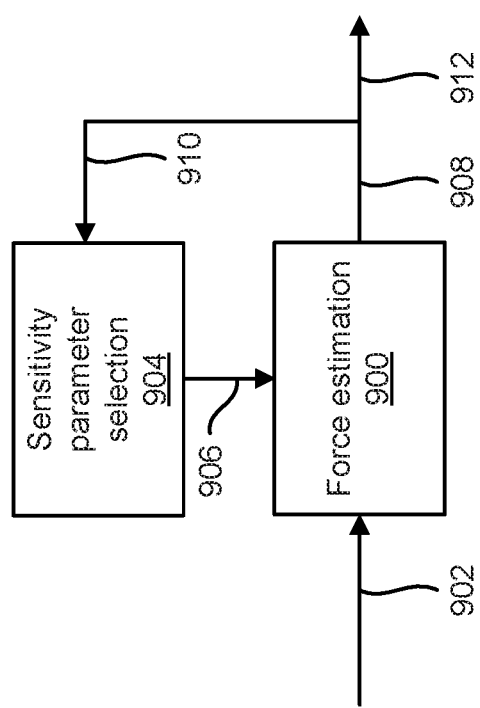
FIG. 9 shows an example of force estimation circuitry that can be used in calibrating an electronic device.

FIG. 9 shows an example of force estimation circuitry 900 that can be used in calibrating an electronic device. The force estimation circuitry 900 can be used in any or all examples described herein. For example, the force estimation circuitry 900 can be implemented in one or more devices exemplified below with reference to FIG. 13.

The force estimation circuitry 900 can receive an input 902. In some implementations, the input 902 corresponds to the reading(s) of one or more force sensors of a trackpad. For example, force sensors of the force sensing circuitry 806 (FIG. 8) can generate the input 902.

The force estimation circuitry 900 will use one or more sets of sensitivity parameters in estimating force. A sensitivity parameter selection circuitry 904 can provide one or more selections, as schematically illustrated by an input 906 to the force estimation circuitry 900. The force estimation circuitry 900 uses the sensitivity parameter set(s) in generating at least one output 908.

The following example illustrates a possible use of the force estimation circuitry 900 and the sensitivity parameter selection circuitry 904. Sets of sensitivity parameters have been selected, each set corresponding to a test weight that was applied to the trackpad in a calibration session. The test weights can be selected based on the expected range of force to be applied to the trackpad. For example, four sets of sensitivity parameters may have been selected, corresponding to test weights of 100 g, 200 g, 300 g, and 500 g, respectively. When the trackpad is in use—that is, not during a calibration session—the sensitivity parameter selection circuitry 904 may pick one of the sets of sensitivity parameters as a default. For example, the sensitivity parameter selection circuitry 904 may select the set of sensitivity parameters corresponding to 300 g, and this is reflected in the input 906 to the force estimation circuitry 900. This can be considered primary sensitivity parameters.

Accordingly, the force estimation circuitry 900 applies the set of sensitivity parameters corresponding to 300 g to the reading of the force sensor(s) and estimates a force which is reflected in the output 908. This can be considered primary estimated force. For example, assume that the estimated force is equivalent to the gravitational force of a mass of 200 g, which is different from the 300 g on which the default set of sensitivity parameters is based. The output 908 can be provided to the sensitivity parameter selection circuitry 904 by way of a feedback 910. The sensitivity parameter selection circuitry 904 can then, based on the output 908, select another of the sets of sensitivity parameters. For example, assume that the sensitivity parameter selection circuitry 904 selects the set of sensitivity parameters corresponding to 200 g and provides the input 906 to the force estimation circuitry 900 accordingly. This can be considered secondary sensitivity parameters. The force estimation circuitry 900 applies the set of sensitivity parameters corresponding to 200 g to the reading of the force sensor(s) and estimates a force which is reflected in an updated version of the output 908. This can be considered secondary estimated force. This approach may generate a more reliable, precise, exact, and/or representative output because the set of sensitivity parameters was selected based on some knowledge about the applied force as represented by the feedback 910. A final output 912 can represent the new calculation done by the force estimation circuitry 900.

Figure 10:
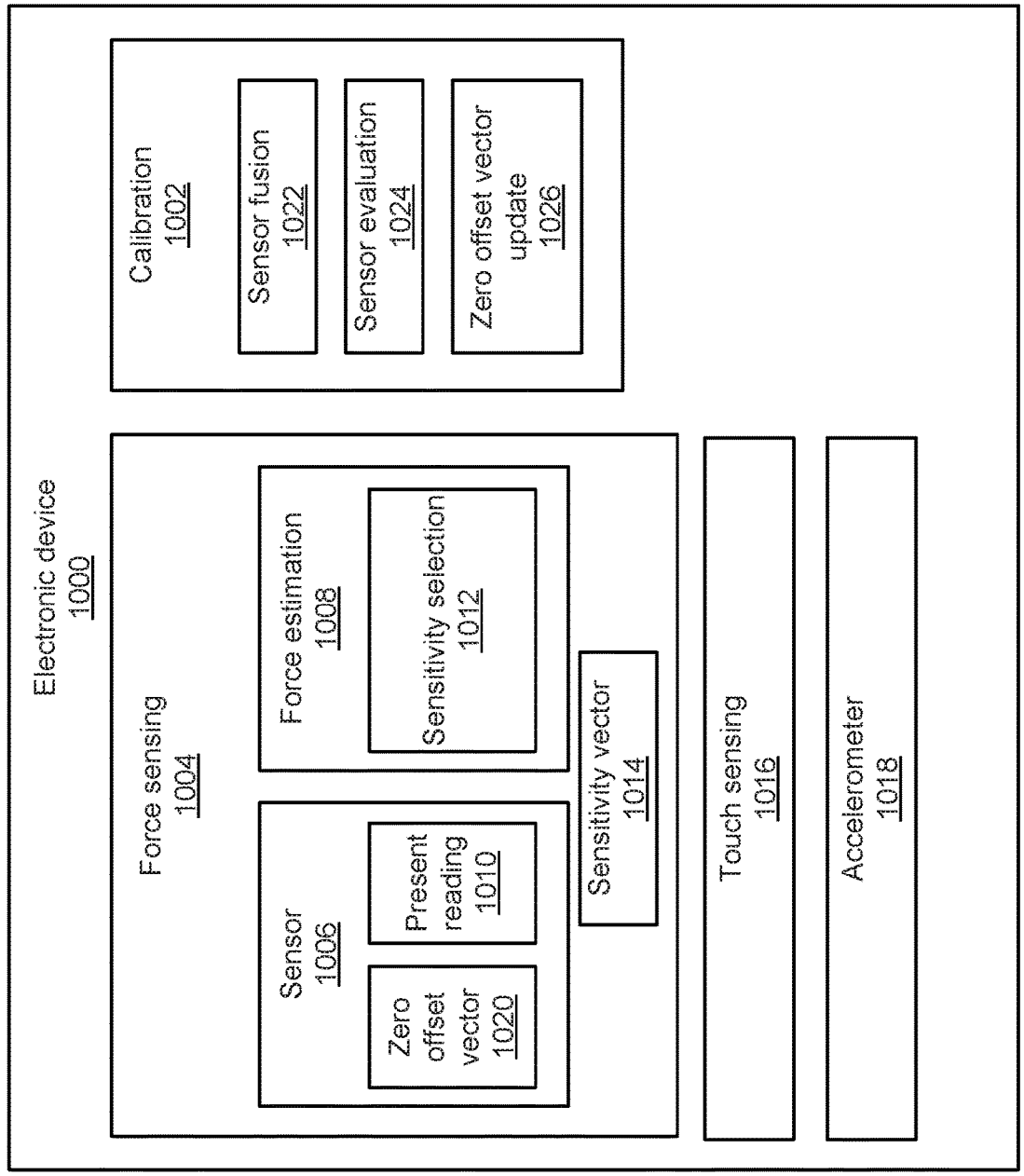
FIG. 10 shows an example of an electronic device with calibration circuitry.

FIG. 10 shows an example of an electronic device 1000 with calibration circuitry 1002. The electronic device 1000 can be used in any or all examples described herein. For example, the electronic device 1000 can be implemented in one or more devices exemplified below with reference to FIG. 13.

The electronic device 1000 includes force sensing circuitry 1004. The force sensing circuitry 1004 can be used in one or more other examples described elsewhere herein. The force sensing circuitry 1004 can include one or more sensors 1006 for sensing force. The sensor(s) 1006 can be configured for detecting a difference in a gap between conductive components by way of sensing a difference in inductance or capacitance, to name just a few examples. The force sensing circuitry 1004 can include force estimation circuitry 1008 that can use a present reading 1010 of the sensor 1006 to estimate a force applied to a trackpad of the electronic device 1000. This can be done by applying a set of sensitivity parameters to the reading. For example, sensitivity selection circuitry 1012 can select, and provide to the force estimation circuitry 1008, at least one sensitivity vector 1014. The electronic device 1000 can include touch sensing circuitry 1016 and an accelerometer 1018.

When the electronic device 1000 is manufactured, the force sensing circuitry 1004 can be calibrated according to a present state of the sensor(s) 1006. This can involve defining a zero offset vector 1020. The zero offset vector 1020 can be considered as corresponding to an initial gap in the touchpad. For example, the zero offset vector 1020 represents the normal separation of the gap and will be used as a baseline to determine when the gap changes from that initial value, which may then be a sign that force is being applied to the trackpad.

The force can then be estimated as follows:

$$F = [S_1 \ \ldots \ S_m] \cdot \left( \begin{bmatrix} D_1 \\ \vdots \\ D_m \end{bmatrix} - \begin{bmatrix} O_1 \\ \vdots \\ O_m \end{bmatrix} \right),$$

where $D_1 \ldots D_m$ are the readings from sensors 1 through m, respectively, and $O_1 \ldots O_m$ are the zero offset values associated with the sensors 1 through m, respectively. Accordingly, when each of the values of the reading vector D equals the corresponding value of the zero offset vector O, the resulting reading value is zero, and a resulting force of zero will be detected. However, when one or more of the readings $D_1 \ldots D_m$ differs from the corresponding zero offset values $O_1 \ldots O_m$, a net force F is detected. For example, this reading can occur when a user touches the trackpad with a finger or a stylus.

However, the detection can suffer from quality drawbacks in one or more regards. In some implementations, the gap can be susceptible to deformation of the external system. For example, if a user bends, twists, or otherwise applies force to an electronic device, this can result in a change in the gap. If the electronic device is dropped this can also or instead cause the gap to change. If the gap changes from its size at the time of assembly, then the original calibration done at the assembly stage may no longer be optimal or even relevant. As a result, one or more of the sensitivity values may no longer be proper. For example, if the gap becomes smaller this can lead to false triggers of force signals, which can result in unwanted input or output. As another example, if the gap becomes larger then no force input or a weakened force input may be detected when the user touches or presses against the touchpad. The sensitivity may become diminished.

To address the above and/or another situation, the electronic device 1000 may include the calibration circuitry 1002. Here, the calibration circuitry 1002 includes sensor fusion circuitry 1022. The sensor fusion circuitry 1022 can determine that the trackpad satisfies a resting condition. In some implementations, the resting condition requires that the trackpad is not subjected to force and is not being touched. For example, the touch sensing circuitry 1016 and/or the accelerometer 1018 can be used for determining whether the resting condition is satisfied. Here, the calibration circuitry 1002 includes sensor evaluation circuitry 1024. In some implementations, the sensor evaluation circuitry 1024 can obtain the present reading 1010 of the sensor(s) 1006. For example, this can be done for purposes of establishing a new baseline relating to a current gap separation of the touchpad. Here, the calibration circuitry 1002 includes zero offset vector update circuitry 1026. In some implementations, the zero offset vector update circuitry 1026 can provide the reading obtained by the sensor evaluation circuitry 1024 to the force sensing circuitry 1004. For example, the reading can be used for updating (e.g., overwriting) the zero offset vector 1020).

Assume that the new reading is used for defining an updated zero offset vector O' with values $O'_1 \ldots O'_m$. After the update of the zero offset vector, the force can be determined as follows:

$$F = [S_1 \ \ldots \ S_m] \cdot \left( \begin{bmatrix} D_1 \\ \vdots \\ D_m \end{bmatrix} - \begin{bmatrix} 0'_1 \\ \vdots \\ 0'_m \end{bmatrix} \right).$$

According to the above, the calculation of the force F now takes into account the updated zero offset vector O' instead of the earlier zero offset vector O. This may improve the force sensing. For example, false triggers, unregistered user input, and/or sensitivity loss can be eliminated or reduced.

The previous example illustrates that a calibration done at an assembly stage can be updated one or more times after the trackpad has been in use for some time, or after a potentially damaging event, such as if an electronic device is dropped. In some implementations, a trackpad can evaluate whether to define an updated zero offset vector in response to the trackpad being at rest. In some implementations, in response to a touch sensor indicating that no touching of the touchpad is detected, and an accelerometer indicating that the touchpad is not subjected to force, it can be evaluated whether to update the zero offset vector. For example, if the force sensor indicates a net force while the resting condition is satisfied, this may be a sign that the zero offset vector should be updated.

Figure 11:
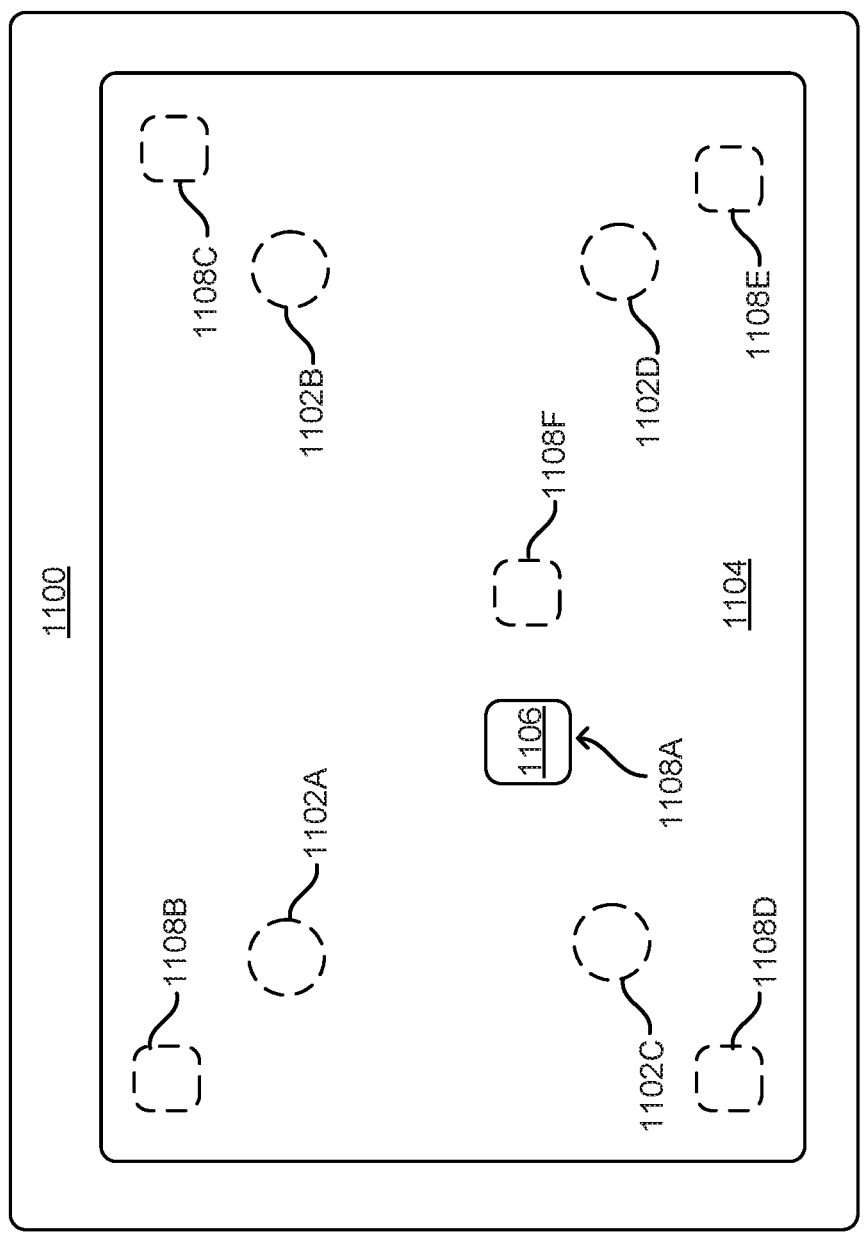
FIG. 11 schematically shows a trackpad with force sensors.

The following example relates to calibration that may be performed at an assembly stage. FIG. 11 schematically shows a trackpad 1100 with force sensors 1102A-D. The trackpad 1100 can be used in any or all examples described herein. For example, the trackpad 1100 can be implemented in one or more devices exemplified below with reference to FIG. 13. The force sensors 1102A-D can be configured for sensing force by way of detecting change in a gap of the trackpad 1100 (compare, e.g., with the distance 408 in FIG. 4). For example, the force sensors 1102A-D can operate based on inductive and/or capacitive measurements. Here, the force sensors 1102A-D are placed toward respective corners of the trackpad 1100. Other locations can be used. More or fewer force sensors than the force sensors 1102A-D can be used.

The trackpad 1100 here includes a touch surface 1104 that is designed to face toward the user when the trackpad 1100 is in operation. When a user touches the touch surface 1104, this may be registered by the trackpad 1100 both as a touch input (e.g., as a point location on the touch surface or as a gesture) and as a force input (e.g., as a tap or click on the trackpad 1100). The touch surface 1104 may occupy a smaller area than the trackpad 1100. The touch surface 1104 can include a substrate made of a material such as metal, glass, and/or a polymer, to name just a few examples.

Calibration of the trackpad 1100 can be done using one or more physical objects. Any type of physical object that can be placed to rest against the trackpad 1100 can be used, whether or not the touch surface 1104 registers the presence of the physical object. If the touch surface 1104 does register the presence of the physical object and the location of its placement, this can be used to ensure that the calibration process is performed according to protocol. Here, a physical object 1106 has been placed at a location 1108A which is somewhat left of the center of the touch surface 1104. For example, the physical object 1106 can be a weight having a predetermined mass.

The following exemplifies aspects of a calibration procedure. The physical object 1106 can be placed at the location 1108A and the reading of the force sensors 1102A-D can be registered. Then, the physical object 1106 can be placed at the location 1108B which is in a top left corner of the touch surface 1104, and another reading of the force sensors 1102A-D can be registered. This step can be repeated for each of a location 1108C (in a top right corner of the touch surface 1104), a location 1108D (in a bottom left corner of the touch surface 1104), and a location 1108E (in a bottom right corner of the touch surface 1104). The locations can be selected by location selection circuitry 810 (FIG. 8), for example by outputting an instruction to a calibration operator on the user interface 822 (FIG. 8). At each of the locations 1108A-E, each of the force sensors 1102A-D can generate a respective reading. In this example, the readings can be organized as follows:

$$\begin{bmatrix} F_x \\ F_x \\ F_x \\ F_x \\ F_x \end{bmatrix} = \begin{bmatrix} D_{11} & D_{12} & D_{13} & D_{14} \\ D_{21} & D_{22} & D_{23} & D_{24} \\ D_{31} & D_{32} & D_{33} & D_{34} \\ D_{41} & D_{42} & D_{43} & D_{44} \\ D_{51} & D_{52} & D_{53} & D_{54} \end{bmatrix} \cdot \begin{bmatrix} s_{1x} \\ s_{2x} \\ s_{3x} \\ s_{4x} \end{bmatrix},$$

where each row of the D readings array corresponds to the readings registered when the physical object 1108 is at a respective one of the locations 1108A-E, and each column of the D readings array corresponds to the readings generated by a respective one of the force sensors 1102A-D. Moreover, the force array F contains the same value (here $F_x$) in each position because the same weight (i.e., the physical object 1106) was used for all the readings. As such, the known force is the same in all the readings.

The subscript x here identifies the weight of the physical object 1106 that was used in the readings. The sensitivity parameter array S, moreover, contains one entry for each of the force sensors used in the readings. More generally, when n location placements are detected by m force sensors, the readings can form an n×m array, which in the above example is a 5×4 array. The known force values form an n×1 array, which in the above example is a 5×1 array. The sensitivity parameters form an m×1 array, which in the above example is a 4×1 array. The indices n and m can have different integer values in various implementations.

In the above example, the sensitivity parameters ($S_{1x}, \ldots, S_{4x}$) are the unknown entities that are sought to be determined. However, there are more equations (i.e., n number of equations, here 5) than unknown entities (i.e., m number of unknowns, here four), so the relationship is overdetermined. As such, depending on the values of the readings and the force, no values of the sensitivity parameters may simultaneously satisfy all the equations. In some implementations, the number of locations involved in the calibration is deliberately selected so that the set of relationships will form an overdetermined system.

To address an overdetermined set of relationships, one or more approximation approaches can be taken. In some implementations, a linear least squares is performed to select sensitivity parameters. Using the array entities from the above example, performing the linear least squares can involve forming a vector expression [F−DS] that includes the n×1 array (F) subtracted by a product (DS) of the n×m array and the m×1 array. In other words, the vector expression can be:

$$\begin{bmatrix} F_x \\ F_x \\ F_x \\ F_x \\ F_x \end{bmatrix} - \begin{bmatrix} D_{11} & D_{12} & D_{13} & D_{14} \\ D_{21} & D_{22} & D_{23} & D_{24} \\ D_{31} & D_{32} & D_{33} & D_{34} \\ D_{41} & D_{42} & D_{43} & D_{44} \\ D_{51} & D_{52} & D_{53} & D_{54} \end{bmatrix} \cdot \begin{bmatrix} s_{1x} \\ s_{2x} \\ s_{3x} \\ s_{4x} \end{bmatrix}.$$

An expression $\|\cdot\|^2$ can denote the least square applied to vector calculation. Performing the linear least squares can involve minimizing the norm of that vector expression, that is:

$$\min \|F-DS\|^2,$$

which involves the known force values (F) and the readings (D). Here, F is a vector, D is a sensing matrix, and S is also a vector. The sensitivity parameters of the array S are to be selected so that the value of the expression is minimized.

That is, the above approach can result in a selection of sensitivity parameters S for a particular weight of the physical object 1106, corresponding to the index x. This can be considered a sensitivity parameter vector for the particular weight that was used. This selected set of sensitivity parameters can be provided to force sensing circuitry for use in sensing force on a touchpad, and/or further calibration can be performed, for example as follows.

In the present example, the force sensors 1102A-D are in touch areas (i.e., in areas covered by the touch surface 1104). That is, the touch surface 1104 here covers a larger area than what is spanned by the placement of the force sensors 1102A-D. Therefore, in this example, the calibration area (i.e., the area spanned by the locations 1108A-E) is larger than the physical locations of the force sensors 1102A-D. In some implementations, some or all of these aspects may have different relationships with regard to each other.

Measurements can be performed with one or more other weights. In some implementations, one or more additional measurements can be registered with different force input(s). The different force inputs can correspond to using a weight with different mass than the physical object 1106. Any different masses can be used. For example, masses that are within a range of expected touchpad force inputs can be used. Each mass can then correspond to a different value of the index x, and the corresponding set of sensitivity parameters can then be selected for each respective one of the weights. In one example, the following sensitivity parameter arrays may be registered:

$$\begin{bmatrix} S_{11} \\ S_{21} \\ S_{31} \\ S_{41} \end{bmatrix}, \begin{bmatrix} S_{12} \\ S_{22} \\ S_{32} \\ S_{42} \end{bmatrix}, \begin{bmatrix} S_{13} \\ S_{23} \\ S_{33} \\ S_{43} \end{bmatrix}, \text{ and } \begin{bmatrix} S_{14} \\ S_{24} \\ S_{34} \\ S_{44} \end{bmatrix},$$

where the index x=1 may correspond to a 300 g mass, the index x=2 may correspond to a 200 g mass, the index x=3 may correspond to a 500 g mass, and the index x=4 may correspond to a 700 g mass, to name just a few examples. The above sensitivity parameter arrays will here be referred to as $S_1$, $S_2$, $S_3$, and $S_4$, respectively, where only the index x (for the corresponding mass) is used. The sensitivity parameter arrays $S_1$, $S_2$, $S_3$, and $S_4$ can be used individually (for example as illustrated below), or further processing can be performed, such as along the lines of the following example.

The sensitivity parameter arrays $S_1$, $S_2$, $S_3$, and $S_4$ can be adjusted into a more coherent set of sensitivity parameters. In some implementations, a polynomial linear fitting can be performed. For example, a polynomial expression can be formulated involving unknowns and coefficients, and this expression can be adapted to fit, as well as possible, to the individual values of the sensitivity parameter arrays $S_1$, $S_2$, $S_3$, and $S_4$. In a sense, the values of the individual sensitivity parameter arrays can be confirmed to each other so as to find the one set of sensitivity parameters that is the best fit across the range of masses that were used in the calibration process. The set of sensitivity parameters that is selected as a result of this process can be provided to force sensing circuitry for use in detecting force on a touchpad.

In some implementations, force sensing circuitry can perform a selection of one or more particular sets of sensitivity parameters. Continuing the example described with reference to FIG. 9, the sensitivity parameter selection circuitry 904 can initially select, say, the array $S_2$ to be used. Based on applying the array $S_2$ to the obtained readings, it may be determined whether the thus estimated force (or mass) is more closely related to the array $S_2$ than to another of the available sensitivity parameter arrays. If the outcome is yes, then the determined force/mass can be used as the received force input. However, if the estimated force/mass is more closely related to another of the sensitivity parameter arrays, then that array (e.g., one of the arrays $S_1$, $S_3$, or $S_4$ in this example) can instead be applied to the reading and the resulting determined force/mass can be used as the received force input.

One or more validations can be performed after at least one calibration process. In some implementations, after the set of sensitivity parameters has been selected, the physical object 1106 can be placed at a location that was not part of the calibration process (e.g., determined by the location selection circuitry 810 in FIG. 8), and another force determination can be performed using the selected set(s) of sensitivity parameters. Here, the physical object 1106 can be placed at a location 1108F that is different than the locations 1108A-E, and readings can be registered using the force sensors 1102A-D. For example, this may involve using a set of sensitivity parameters that is the result of polynomial fitting from respective sets of sensitivity parameters associated with corresponding weights used in the calibration process. As another example, this may involve beginning with a default (e.g., selected) set of sensitivity parameters and obtaining an estimate force/mass result, and thereafter selecting another set of sensitivity parameters based on the estimate and performing another determination. The force (or mass) determined based on the readings at the location 1108F can be compared with the known force (mass) value. The validation can either indicate that the touchpad is properly calibrated using the set of sensitivity parameters, or that it may be necessary to perform another calibration.

Implementations can provide one or more advantages. Prior touchpads have been observed to have unit-to-unit variations. For example, the force input requirement to trigger haptic feedback may (significantly) differ between units. This occurrence can be observed among units of the same hardware brand of electronic device, and/or between the units of different hardware devices that may be designed for a common platform (such as having the same operating system).

Prior touchpads have been observed to have spatial variations within the same device. For example, this has been noted with a classical diving board design of trackpad.

Prior touchpads have been observed to have non-linearity in force input, such as in the force-to-displacement relationship. This may be a result of sensor non-linearity and/or non-linearity in mechanical structure.

In overcoming or reducing certain drawbacks, implementations can do one or more of the following. A capacity to provide customized multi-level force input can be provided. Designs can alleviate non-uniformity of force input, also regarding mechanical compliance (e.g., relating to a touch surface substrate).

Figure 12:
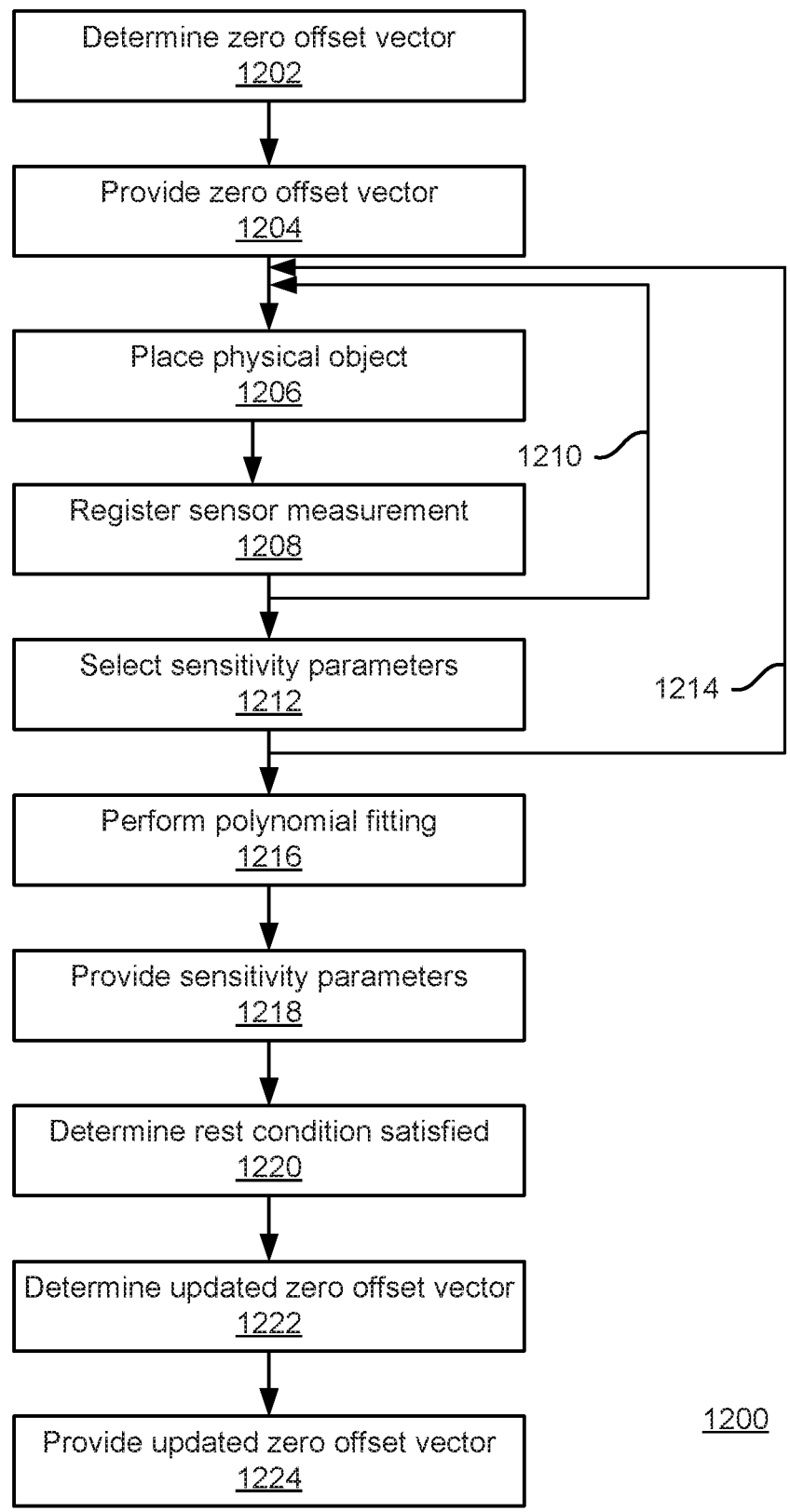
FIG. 12 shows an example of a process that can be used for calibration.

FIG. 12 shows an example of a process 1200 that can be used for calibration. The process 1200 can be used with one or more examples described elsewhere herein. More or fewer operations than shown can be performed. Unless otherwise indicated, two or more operations can be performed in a different order than shown. Some elements of other examples will be referred to for illustrative purposes.

At 1202, a zero offset vector can be determined. For example, the force sensing circuitry 1004 can determine the zero offset vector 1020 (FIG. 10).

At 1204, the zero offset vector can be provided to force sensing circuitry. For example, the zero offset vector 1020 can be provided to the force sensing circuitry 1004 after being determined.

At 1206, an object can be placed at a location on the touchpad to which the force sensing circuitry is coupled. For example, the physical object 1106 can be placed on the touch surface 1104 of the trackpad 1100 (FIG. 11).

At 1208, readings of respective force sensors can be registered based on the object being placed at the location. A total of m number of readings (m=1, 2, 3, . . . ) can be registered using m number of force sensors. For example, the force sensors 1102A-D can register respective readings based on the physical object 1106 being placed at the location 1108A.

At 1210, at least the operations at 1206 and 1208 can be performed again one or more times. In some implementations, the operations at 1206 and 1208 can be performed a total of n times (n=1, 2, 3, . . . ), once for each possible location.

At 1212, a set of sensitivity parameters can be selected. For example, the sensitivity parameter array S can be selected based on performing a linear least squares of an overdetermined system of relationships.

At 1214, at least the operations 1206, 1208, and 1212 can be performed again one or more times. In some implementations, this can be done using an object with a different mass than the physical object 1106. For example, the weight selection circuitry 808 can output an instruction on the user interface 822 for the calibration operator to select another mass. The result may be that a number of sensitivity parameter arrays have been selected for respective different weights. For example, the sensitivity parameter arrays $S_1$, $S_2$, $S_3$, and $S_4$ described with reference to FIG. 11 can result, each associated with a different mass.

At 1216, a polynomial fitting of the sensitivity parameter arrays can be performed. For example, this can result in selection of a set of sensitivity parameters that best fits the performance associated with the force estimations done for different masses at the respective locations.

At 1218, the set of sensitivity parameters can be provided to force sensing circuitry. For example, the sensitivity vector 1014 (FIG. 1) can be provided to the force sensing circuitry 806 (FIG. 8) of the electronic device 802. The force sensing circuitry can use the set of sensitivity parameters in estimating force applied to a touchpad.

At 1220, it can be determined that a trackpad satisfies a resting condition. This can be done after the trackpad is used for some period of time. In some implementations, it can be determined using the touch sensing circuitry 702 and the accelerometer 710 (FIG. 7) that the trackpad is at rest (e.g., is not being accelerated and is not being touched). For example, the trackpad can perform this determination regularly, such as every minute, second, or fraction of second, to name just a few possibilities.

At 1222, and upon the resting condition being satisfied at 1220, an updated zero offset vector can be determined. For example, this can be done by zero offset vector update circuitry 1026 (FIG. 10).

At 1224, the updated zero offset vector can be provided to force sensing circuitry.

Implementations can be used with one or more methods. For example, such a method may involve placing a first physical object at each of a first plurality of locations on a trackpad; while the first object is at each of the first plurality of locations, registering respective first readings from each of a second plurality of force sensors of the trackpad, the first plurality greater than the second plurality; selecting a first plurality of sensitivity parameters for the trackpad based at least in part on the first readings; and providing the first plurality of sensitivity parameters to force sensing circuitry of the trackpad, the force sensing circuitry coupled to the second plurality of force sensors. A method can be performed based on non-transitory storage medium (e.g., as described with reference to FIG. 13) having stored therein instructions that when executed by a processor cause the processor to perform operations corresponding to the method.

Implementations can form, or be used with, one or more systems. For example, such a system may involve a processor (e.g., the processor 1302 or 1352 in FIG. 13); a memory (e.g., the memory 1304 or 1364 in FIG. 13); an enclosure (e.g., the enclosure 718 in FIG. 7); a trackpad (e.g., the trackpad 100 in FIG. 1) coupled to the enclosure, the trackpad having a first plurality of locations (e.g., the locations 1108A-E in FIG. 11); a second plurality of force sensors (e.g., the force sensors 1102A-D) coupled to the trackpad, the first plurality greater than the second plurality; and force sensing circuitry (e.g., the force sensing circuitry 806 in FIG. 8) coupled to the second plurality of force sensors, the force sensing circuitry having a first plurality of sensitivity parameters (e.g., the array S) selected based at least in part on first readings (e.g., the array D) registered from each of the second plurality of force sensors while a first object (e.g., the physical object 1106) is at each of the first plurality of locations.

Figure 13:
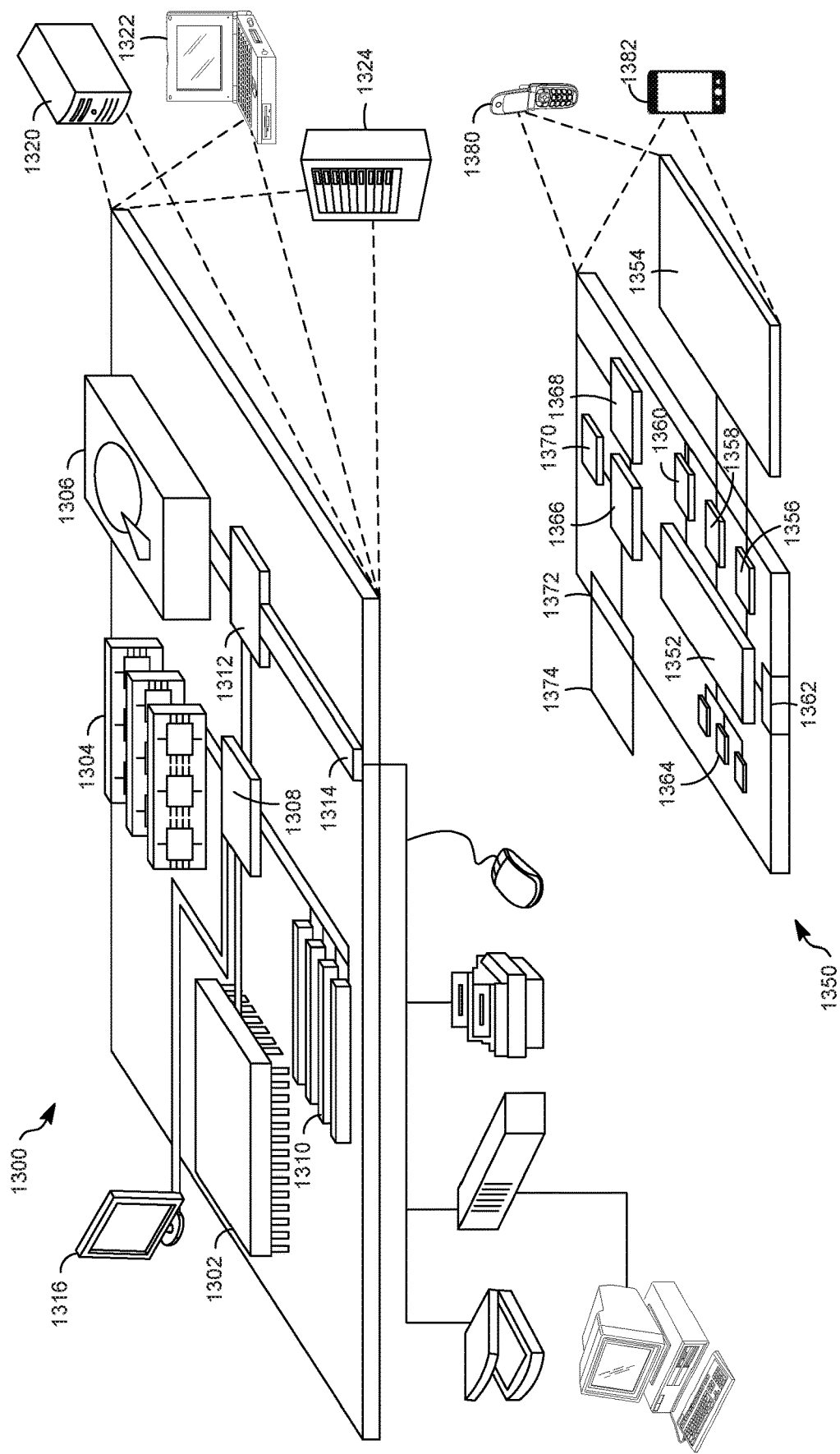
FIG. 13 shows an example of a computer device and a mobile computer device that can be used to implement the techniques described here.

FIG. 13 shows an example of a computer device and a mobile computer device that can be used to implement the techniques described here. FIG. 13 shows an example of a generic computer device 1300 and a generic mobile computer device 1350, which may be used with the techniques described here. Computing device 1300 is intended to represent various forms of digital computers, such as laptops, desktops, tablets, workstations, personal digital assistants, televisions, servers, blade servers, mainframes, and other appropriate computing devices. Computing device 1350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. The processor 1302 can be a semiconductor-based processor. The memory 1304 can be a semiconductor-based memory. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smart phone 1382, personal digital assistant, or other similar mobile device.

A user can interact with a computing device using a tracked controller 1384. In some implementations, the controller 1384 can track the movement of a user's body, such as of the hand, foot, head and/or torso, and generate input corresponding to the tracked motion. The input can correspond to the movement in one or more dimensions of motion, such as in three dimensions. For example, the tracked controller can be a physical controller for a VR application, the physical controller associated with one or more virtual controllers in the VR application. As another example, the controller 1384 can include a data glove.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 13 can include sensors that interface with a virtual reality (VR headset 1385). For example, one or more sensors included on a computing device 1350 or other computing device depicted in FIG. 13, can provide input to VR headset 1385 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1350 can use the sensors to determine an absolute position and/or a detected rotation of the computing device in the VR space that can then be used as input to the VR space. For example, the computing device 1350 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1350 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1350 when the computing device is incorporated into the VR space can cause a particular action to occur in the VR space.

In some implementations, a touchscreen of the computing device 1350 can be rendered as a touchpad in VR space. A user can interact with the touchscreen of the computing device 1350. The interactions are rendered, in VR headset 1385 for example, as movements on the rendered touchpad in the VR space. The rendered movements can control objects in the VR space.

In some implementations, one or more output devices included on the computing device 1350 can provide output and/or feedback to a user of the VR headset 1385 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1350 may appear as another object in a computer-generated, 3D environment. Interactions by the user with the computing device 1350 (e.g., rotating, shaking, touching a touchscreen, swiping a finger across a touch screen) can be interpreted as interactions with the object in the VR space. In the example of the laser pointer in a VR space, the computing device 1350 appears as a virtual laser pointer in the computer-generated, 3D environment. As the user manipulates the computing device 1350, the user in the VR space sees movement of the laser pointer. The user receives feedback from interactions with the computing device 1350 in the VR space on the computing device 1350 or on the VR headset 1385.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   placing a first physical object at each of a first plurality of locations on a trackpad;
   while the first object is at each of the first plurality of locations, registering respective first readings from each of a second plurality of force sensors of the trackpad, the first plurality greater than the second plurality;
   selecting a first plurality of sensitivity parameters for the trackpad based on the first readings and no other calibration locations, wherein selecting the first plurality of sensitivity parameters comprises performing a linear least squares, wherein the linear least squares involves known force values and the first readings, wherein the first readings form an n×m array, the number n equal to the first plurality, the number m equal to the second plurality, wherein the first plurality of sensitivity parameters form an m×1 array, wherein the known force values form an n×1 array, wherein a vector expression includes the n×1 array subtracted by a product of the n×m array and the m×1 array, and wherein performing the linear least squares includes minimizing a norm of the vector expression; and
   providing the first plurality of sensitivity parameters to force sensing circuitry of the trackpad, the force sensing circuitry coupled to the second plurality of force sensors.

2. The method of claim 1, further comprising:
   determining a first plurality of first sensitivity parameters corresponding to the first readings, wherein the first plurality of sensitivity parameters is selected based at least in part on the first plurality of first sensitivity parameters.

3. The method of claim 2, further comprising:
   selecting a second physical object having different mass than the first physical object;
   placing the second physical object at each of the first plurality of locations on the trackpad;
   while the second object is at each of the first plurality of locations, registering respective second readings from each of the second plurality of force sensors of the trackpad; and
   determining a first plurality of second sensitivity parameters corresponding to the second readings.

4. The method of claim 3, wherein the first plurality of sensitivity parameters are selected based also at least in part on the first plurality of second sensitivity parameters.

5. The method of claim 4, wherein selecting the first plurality of sensitivity parameters comprises performing a polynomial fitting using the first plurality of first sensitivity parameters and the first plurality of second sensitivity parameters.

6. The method of claim 3, wherein the first plurality of sensitivity parameters includes the first plurality of first sensitivity parameters and the first plurality of second sensitivity parameters, the method further comprising:
   registering a third reading of the second plurality of force sensors based on a third physical object touching the trackpad;
   selecting primary sensitivity parameters from among the first plurality of first sensitivity parameters and the first plurality of second sensitivity parameters;
   determining, using the force sensing circuitry, a primary estimated force of the third physical object based on the third reading and the primary sensitivity parameters;
   selecting secondary sensitivity parameters from among the first plurality of first sensitivity parameters and the first plurality of second sensitivity parameters based on the primary estimated force;
   determining, using the force sensing circuitry, a secondary estimated force of the third physical object based on the third reading and the secondary sensitivity parameters; and
   performing an action, in response to the third physical object touching the trackpad, based on the secondary estimated force.

7. The method of claim 1, further comprising:
   placing the first physical object at another location on the trackpad not included in the first plurality of locations;
   registering a third reading of the second plurality of force sensors based on the first physical object placed at the other location;

determining, using the force sensing circuitry, an estimated force of the first physical object based on the third reading and the first plurality of sensitivity parameters; and validating the first plurality of sensitivity parameters based on the estimated force.

8. The method of claim 1, wherein the force sensing circuitry is configured to detect force by way of a gap determination, the method further comprising:

determining an initial zero offset vector for the trackpad, the initial zero offset vector corresponding to an initial gap of the trackpad; and providing the initial zero offset vector to the force sensing circuitry.

9. The method of claim 8, further comprising:

after use of the trackpad involving the initial zero offset vector, determining that the trackpad satisfies a resting condition;

after determining that the trackpad satisfies the resting condition, determining an updated zero offset vector for the trackpad; and providing the updated zero offset vector to the force sensing circuitry.

10. The method of claim 9, wherein the resting condition comprises that a substrate of the trackpad is at rest and that the substrate is not being touched by any physical object.

11. The method of claim 10, wherein the trackpad includes an accelerometer, further comprising using the accelerometer to determine that the substrate of the trackpad is at rest.

12. The method of claim 10, wherein the trackpad includes touch sensing circuitry, further comprising using the touch sensing circuitry to determine that the substrate is not being touched by any physical object.

13. The method of claim 1, wherein a calibration area defined by the first plurality of locations is larger than an area defined by the second plurality of force sensors.

14. A non-transitory storage medium having stored therein instructions that when executed by a processor cause the processor to perform operations comprising:

while a first object is placed at each of a first plurality of locations on a trackpad, registering respective first readings from each of a second plurality of force sensors of the trackpad, the first plurality greater than the second plurality;

selecting a first plurality of sensitivity parameters for the trackpad based on the first readings and no other calibration locations, wherein selecting the first plurality of sensitivity parameters comprises performing a linear least squares, wherein the linear least squares involves known force values and the first readings, wherein the first readings form an n×m array, the number n equal to the first plurality, the number m equal to the second plurality, wherein the first plurality of sensitivity parameters form an m×1 array, wherein the known force values form an n×1 array, wherein a vector expression includes the n×1 array subtracted by a product of the n×m array and the m×1 array, and wherein performing the linear least squares includes minimizing a norm of the vector expression; and providing the first plurality of sensitivity parameters to force sensing circuitry of the trackpad, the force sensing circuitry coupled to the second plurality of force sensors.

15. A system comprising:

a processor;

a memory;

an enclosure;

a trackpad coupled to the enclosure, the trackpad having a first plurality of locations;

a second plurality of force sensors coupled to the trackpad, the first plurality greater than the second plurality; and force sensing circuitry coupled to the second plurality of force sensors, the force sensing circuitry having a first plurality of sensitivity parameters selected based on first readings registered from each of the second plurality of force sensors while a first object is at each of the first plurality of locations and no other calibration locations, wherein selecting the first plurality of sensitivity parameters comprises performing a linear least squares, wherein the linear least squares involves known force values and the first readings, wherein the first readings form an n×m array, the number n equal to the first plurality, the number m equal to the second plurality, wherein the first plurality of sensitivity parameters form an m×1 array, wherein the known force values form an n×1 array, wherein a vector expression includes the n×1 array subtracted by a product of the n×m array and the m×1 array, and wherein performing the linear least squares includes minimizing a norm of the vector expression.

16. The system of claim 15, wherein the force sensing circuitry is configured to detect force by way of a gap determination, wherein the force sensing circuitry includes an initial zero offset vector corresponding to an initial gap of the trackpad, and wherein the system is configured to determine an updated zero offset vector for the force sensing circuitry when the trackpad satisfies a resting condition.

17. The system of claim 16, further comprising an accelerometer, wherein the system uses the accelerometer to determine that the trackpad satisfies the resting condition.

18. The system of claim 16, further comprising touch sensing circuitry, wherein the system uses the touch sensing circuitry to determine that the trackpad satisfies the resting condition.

19. The system of claim 15, wherein the force sensing circuitry further comprises a voltage source, and a chip or other integrated circuit component configured to calculate an inductance as directly proportional to a resistance and inversely proportional to an adjusted frequency of the voltage source.

20. The system of claim 15, wherein the force sensing circuitry further comprises a voltage source, and a chip or other integrated circuit component configured to calculate an inductance as inversely proportional to a capacitance and to an adjusted frequency of the voltage source.

* * * * *